(12) United States Patent
Tsukagoshi

(10) Patent No.: US 10,848,801 B2
(45) Date of Patent: Nov. 24, 2020

(54) TRANSMISSION DEVICE, TRANSMISSION METHOD, RECEPTION DEVICE, AND RECEPTION METHOD

(71) Applicant: Saturn Licensing LLC, New York, NY (US)

(72) Inventor: Ikuo Tsukagoshi, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 16/391,709

(22) Filed: Apr. 23, 2019

(65) Prior Publication Data

US 2019/0253740 A1   Aug. 15, 2019

Related U.S. Application Data

(63) Continuation of application No. 14/913,791, filed as application No. PCT/JP2015/069781 on Jul. 9, 2015, now Pat. No. 10,313,720.

(30) Foreign Application Priority Data

Jul. 18, 2014   (JP) .................................. 2014-147308

(51) Int. Cl.
*H04N 21/2368* (2011.01)
*H04N 21/236* (2011.01)
(Continued)

(52) U.S. Cl.
CPC ....... *H04N 21/2368* (2013.01); *H04N 21/236* (2013.01); *H04N 21/2362* (2013.01);
(Continued)

(58) Field of Classification Search
None
See application file for complete search history.

(56) References Cited

U.S. PATENT DOCUMENTS 5,835,493 A    11/1998  Magee et al.
6,925,577 B1    8/2005  Szucs et al.
(Continued)

FOREIGN PATENT DOCUMENTS

AU    2007318585 A1    5/2008
BR    PI1100944 A2    8/2012
(Continued)

OTHER PUBLICATIONS

Combined Chinese Office Action and Search Report dated Sep. 19, 2019, in Patent Application No. 201580001860.X, 17 pages (with English translation).
(Continued)

*Primary Examiner* — Fernando Alcon
(74) *Attorney, Agent, or Firm* — Oblon, McClelland, Maier & Neustadt, L.L.P.

(57) ABSTRACT

A reception side can easily recognize that metadata is inserted into an audio stream. A container of a predetermined format including an audio stream into which metadata is inserted is transmitted. Identification information indicating that the metadata is inserted into the audio stream is inserted into a layer of the container. At the reception side, it is possible to easily recognize that the metadata is inserted into the audio stream and acquire the metadata reliably without waste by performing the process of extracting the metadata inserted into the audio stream based on the recognition.

17 Claims, 26 Drawing Sheets

(51) Int. Cl.
*H04N 21/434* (2011.01)
*H04N 21/436* (2011.01)
*H04N 21/2362* (2011.01)
*H04N 21/4363* (2011.01)
*H04N 21/6336* (2011.01)
*H04N 21/858* (2011.01)
*H04N 21/84* (2011.01)

(52) U.S. Cl.
CPC ......... *H04N 21/434* (2013.01); *H04N 21/436* (2013.01); *H04N 21/4341* (2013.01); *H04N 21/43635* (2013.01); *H04N 21/6336* (2013.01); *H04N 21/84* (2013.01); *H04N 21/8586* (2013.01)

(56) References Cited

U.S. PATENT DOCUMENTS

| | | | |
|---|---|---|---|
| 6,966,064 | B1 | 11/2005 | Schneidewend et al. |
| 2004/0172376 | A1* | 9/2004 | Kobori ............ H04L 29/12594 |
| 2009/0091656 | A1 | 4/2009 | Kitaru et al. |
| 2010/0066919 | A1 | 3/2010 | Nakajima et al. |
| 2010/0132001 | A1 | 5/2010 | Kitano et al. |
| 2010/0189131 | A1 | 7/2010 | Branam et al. |
| 2011/0292173 | A1 | 12/2011 | Tsukagoshi |
| 2012/0253826 | A1 | 10/2012 | Kitazato et al. |
| 2013/0105567 | A1 | 5/2013 | Choi |
| 2013/0111530 | A1 | 5/2013 | Kitazato |
| 2013/0335629 | A1* | 12/2013 | Laurent ................ H04N 21/236 348/515 |
| 2014/0006951 | A1 | 1/2014 | Hunter |
| 2014/0071236 | A1 | 3/2014 | Tsukagoshi |
| 2014/0133683 | A1 | 5/2014 | Robinson et al. |
| 2015/0372820 | A1 | 12/2015 | Schneider et al. |
| 2016/0196830 | A1 | 7/2016 | Riedmiller et al. |

FOREIGN PATENT DOCUMENTS

| | | |
|---|---|---|
| BR | PI0718563 A2 | 3/2014 |
| CA | 2668980 A1 | 5/2008 |
| CA | 2847147 A1 | 5/2013 |
| CN | 1219809 A | 6/1999 |
| CN | 101015012 A | 8/2007 |
| CN | 101404745 A | 4/2009 |
| CN | 101535922 A | 9/2009 |
| CN | 102263989 A | 11/2011 |
| CN | 103907344 A | 7/2014 |
| EP | 0917355 A1 | 5/1999 |
| EP | 2063643 A1 | 5/2009 |
| EP | 2 146 499 A1 | 1/2010 |
| EP | 2775709 A1 | 9/2014 |
| JP | 11-239186 A | 8/1999 |
| JP | 2008-048438 A | 2/2008 |
| JP | 2011-223353 A | 11/2011 |
| JP | 2012-010311 A | 1/2012 |
| JP | 5109978 B2 | 12/2012 |
| JP | 2014-042312 A | 3/2014 |
| KR | 10-2009-0079879 A | 7/2009 |
| MX | 2014005020 A | 7/2014 |
| RU | 2009117330 A | 11/2010 |
| RU | 2 519 817 C2 | 6/2014 |
| TW | 200830828 A | 7/2008 |
| WO | WO0155889 A1 | 8/2001 |
| WO | 2008/056707 A1 | 5/2008 |
| WO | 2013/065566 A1 | 5/2013 |

OTHER PUBLICATIONS

"Information technology—Generic coding of Moving Pictures and Associated Audio Information—Part 1: Systems", Series H: Audiovisual and Multimedia Systems Infrastructure of audiovisual services—Transmission Multiplexing and Synchronization, ITU-T H.222.0, 5th Edition, Jun. 2012, 228 pages.

Notice of Allowance and Fees Due for U.S. Appl. No. 14/913,791, dated Jan. 17, 2019, 08 pages.

Final Rejection for U.S. Appl. No. 14/913,791, dated Jun. 27, 2018, 10 pages.

Non-Final Rejection for U.S. Appl. No. 14/913,791, dated Feb. 28, 2018, 09 pages.

Advisory Action for U.S. Appl. No. 14/913,791, dated Dec. 11, 2017, 03 pages.

Final Rejection for U.S. Appl. No. 14/913,791, dated Oct. 3, 2017, 08 pages.

Non-Final Rejection for U.S. Appl. No. 14/913,791, dated Jun. 9, 2017, 08 pages.

Office Action for EP Patent Application No. 15822141.6, dated Apr. 10, 2019, 05 pages of Office Action.

Office Action for CN Patent Application No. 201580001860X, dated Feb. 3, 2019, 11 pages of Office Action and 09 pages of English Translation.

Information Technology—Generic Coding of Moving Pictures and Associated Audio Information:Systems ISO/IEC 13818-1, 5th Edition, Jul. 11, 2014,131 pages.

Office Action for JP Patent Application No. 2016-505353, dated Mar. 5, 2019, 05 pages of Office Action and 03 pages of English Translation.

Hirabayashi, et al, "Requirements for 23008-3 AMD1 3D Audio File Format Support", ISO/IEC JTC1/SC29/WG11 MPEG2014/M34348, Jul. 2014, 07 pages.

Extended European Search Report of EP Patent Application No. 15822141.6, dated Feb. 12, 2018, 11 pages.

Partial Supplementary European Search Report of EP Application No. 15822141.6, dated Nov. 10, 2017, 15 pages of PSESR.

International Search Report and Written Opinion of PCT Application. No. PCT/JP2015/069781, dated Sep. 15, 2015, 07 pages of English Translation and 07 pages of ISRWO.

International Preliminary Report on Patentability of PCT Application. No. PCT/JP2015/069781, dated Feb. 2, 2017, 07 pages of English Translation and 05 pages of IPRP.

Office Action for CN Patent Application No. 201580001860.X, dated Feb. 3, 2019, 11 pages of Office Action and 9 pages of English Translation.

Office Action for JP Patent Application No. 2016-505353, dated Mar. 5, 2019, 05 pages of Office Action and 04 pages of English Translation.

"Information Techonology—Generic coding of moving pictures and associated audio information- Systems", ISO/IEC 13818-1:2013, Fifth edition, Jul. 11, 2014, 131 pages.

* cited by examiner

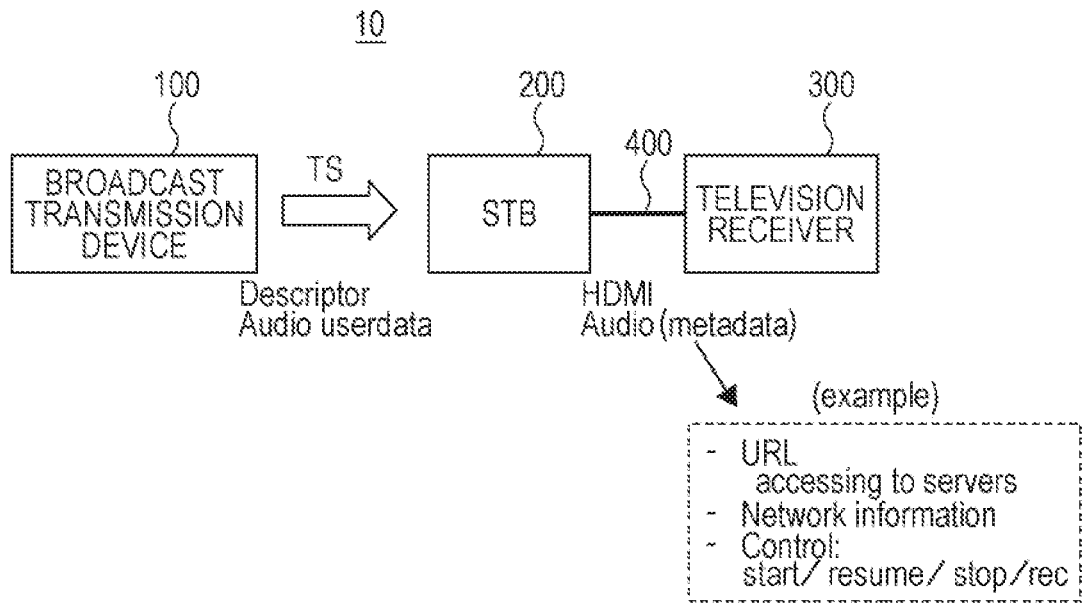
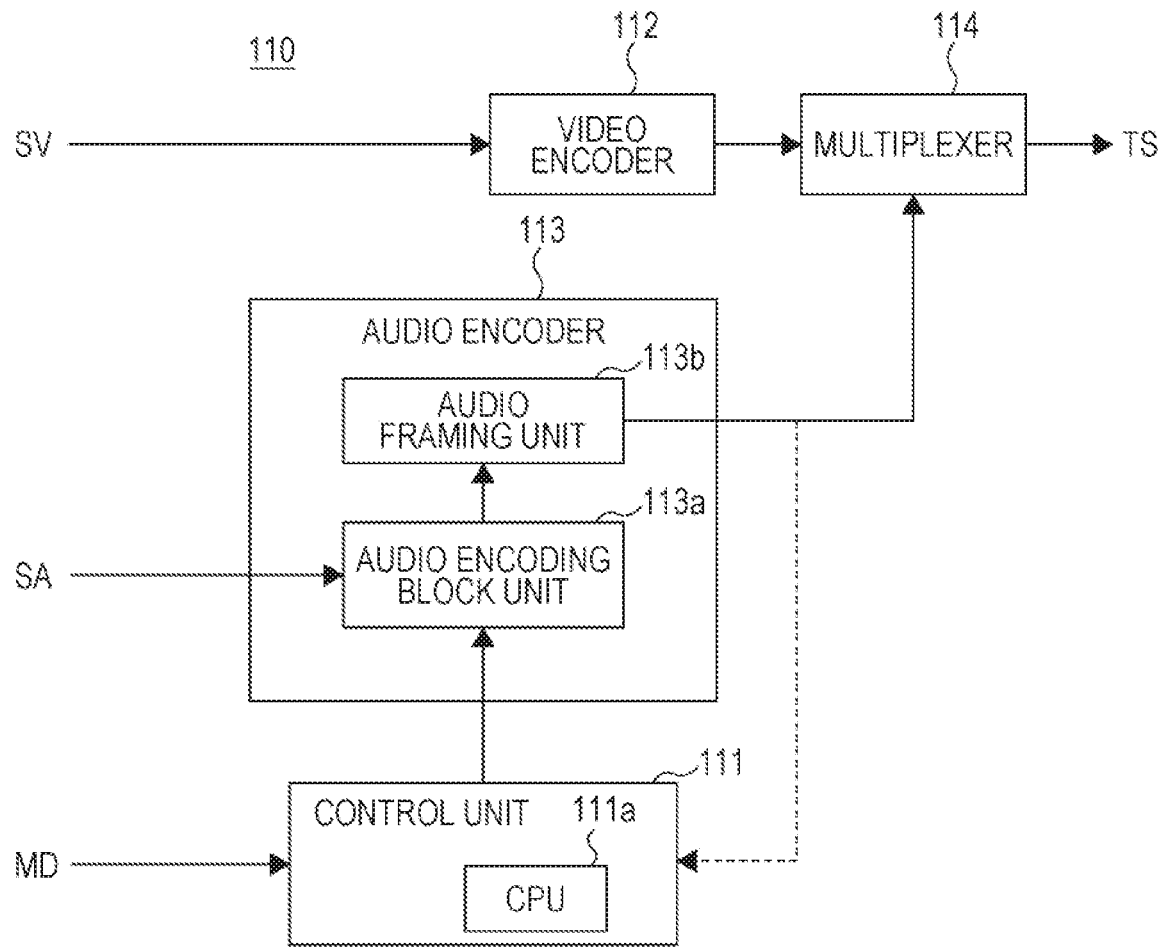

Raw_data_block

CONFIGURATION OF AUXILIARY DATA OF AC3

| Syntax | Word Size |
|---|---|
| auxdata() | |
| { | |
|     auxbits | nauxbits |
|     if(auxdatae) | |
|     { | |
|         auxdatal | 14 |
|     } | |
|     auxdatae | 1 |
| } | |
| /* end of auxdata */ | |

FIG. 6

| Syntax | No. of bits | Mnemonic |
|---|---|---|
| data_stream_element () { | | |
|   element_instance_tag; | 4 | uimsbf |
|   data_byte_align_flag; | 1 | uimsbf |
|   cnt=count | 8 | uimsbf |
|   if (cnt==255) { | | |
|     Cnt += esc_count; | 8 | uimsbf |
|   } | | |
|   if (data_byte_align_flg) { | | |
|     byte_alignment (); | | |
|   } | | |
|   for (I = 0, i<cnt, i++) { | | |
|     data_stream_byte [element_instance_tag] [I]; | 8 | uimsbf |
|   } | | |
| } | | |

FIG. 7

GENERAL-PURPOSE METADATA SYNTAX

| Syntax | No. of Bits | Format |
|---|---|---|
| metadata (){ | | |
| sync_byte | 8 | bslbf |
| metadata_type | 8 | bslbf |
| reserved | 2 | '11' |
| metadata_ID | 3 | bslbf |
| metadata_length | 11 | uimsbf |
| reserved | 3 | bslbf |
| metadata_counter | 3 | bslbf |
| metadata_start_flag | 1 | bslbf |
| sync_control_flag | 1 | bslbf |
| if (sync_control_flag ){ | | |
| metadata_length -= 5 | | |
| PTS_management() | | |
| } | | |
| for ( i = 0; i < metadata_length -1 ; i++ ){ | | |
| data_byte | 8 | bslbf |
| } | | |
| } | | |

FIG. 8

GENERAL-PURPOSE METADATA SYNTAX

| Syntax | No. of Bits | Type |
|---|---|---|
| PTS_management (){ | | |
| reserved | 4 | 0xF |
| marker_bit | 1 | 1 |
| PTS[32..30] | 3 | uimsbf |
| marker_bit | 1 | 1 |
| PTS[29..15] | 15 | uimsbf |
| marker_bit | 1 | 1 |
| PTS[14..0] | 15 | uimsbf |
| } | | |

FIG. 9

GENERAL-PURPOSE METADATA SYNTAX

| Syntax | No. of Bits | Format |
|---|---|---|
| metadata_packet(){ | | |
|   packet_type | 8 | bslbf |
|   metadata_packet_length | 16 | uimsbf |
|   for ( i = 0; i < metadata_packet_length ; i++ ){ | | |
|     data_byte | 8 | bslbf |
|   } | | |
| } | | |

FIG. 10

```
sync_byte (8bits)
 "00000001"              Specifies the unique word for metadata container
metadata_type (8bits)
 "00000001"              Metadata for linking service
 Other values            reserved
metadata_length (11bits)
                         Specifies total byte count of metadata starting from
                         the following field in the current audio frame.
metadata_ID (3bits)      Specifies the identifier within the certain metadata type
metadata_counter (3bits)
                         Specifies the ordering of metadata container by incrementing
                         at each audio frame in modulo 8
metadata_start_flag (1bit)
 "1"                     Metadata_packet starts at the top of current metadata
 "0"                     The current metadata has the connected portion of
                         metadata_packet from the previous metadata
sync_control_flag (1bit)
 "1"                     Metadata is synchronized, and decoder shall refer to PTS
                         in PTS_management()
 "0"                     Metadata is not synchronized
packet_type (8bits)      The content shall be identical to metadata_type in metadta()
 "00000001"              Metadata for linking service
 "00000010"              Metadata for disparity shifting data
metadata_packet_length (16bits)
                         Specifies total byte count of metadata_packet()
```

FIG. 13

Packet_type = "00000001"
Metadata for linking service

| Syntax | No. of Bits | Format |
|---|---|---|
| metadata_linking_packet (){ | | |
|   packet_type | 8 | bslbf |
|   metadata_linking_packet_length | 16 | uimsbf |
|   number_of_units | 8 | bslbf |
|   for ( I = 0; I < number_of_units ; I ++){ | | |
|     unit_ID | 8 | bslbf |
|     unit_size | 8 | uimsbf |
|     if ( unit_size == '255' ) { | | |
|       extended_size | 8 | uimsbf |
|       unit_size += extended_size | | |
|     } | | |
|     for(j=0; j < unit_size ; j++){ | | |
|       unit_data | 8 | simsbf |
|     } | | |
|   } | | |
| } | | |

FIG. 14

```
metadata_linking_packet_length (16bits)
    Specifies the total byte size of metadata_linking_packet
    starting from the following field
number_of_units (8bits)
    Specifies the number of metadata_elements
unit_ID (8bits)
    Specifies the identifier of units
unit_size (8bits)
    Specifies the size of a metadata_element
extended_size (8bits)
    Specifies the extension to unit_size.
    If unit_size exceeds the value 254, extended_size is inserted
    by forcing unit_size being 255.
unit_data (8bits)
    Specifies the metadata_element
```

FIG. 16 audio_userdata_descriptor

| Syntax | No. of Bits | Format |
|---|---|---|
| audio_userdata_descriptor(){ | | |
|     descriptor_tag | 8 | uimsbf |
|     descriptor_length | 8 | uimsbf |
|     audio_codec_type | 8 | uimsbf |
|     metadata_type | 3 | uimsbf |
|     coordinated_control_flag | 1 | bslbf |
|     reserved | 1 | |
|     frequency_type | 3 | uimsbf |
| } | | |

FIG. 17

Semantics of descriptor audio_codec_type (8bits) describes the type of audio codec.
    0x1    MPEG4 AAC
    0x2    USAC
    0x3    AC3
    others    reserved metadata_type (3bits) describes the type of information carried in userdata.
    0x1    metadata to control linked service
    others    reserved coordinated_control_flag (1bit) describes whether the information for control is carried in multiple components.
    '1'    the control information is provided by the other component stream as well. (such as video stream)
    '0'    the control information is provided by audio stream only.

frequency_type (3bits) describes the frequency of userdata insertion among the access units.
    0x1    exactly one userdata is inserted every audio access unit
    0x2    more than one userdata is inserted in an audio access unit
    0x3    at least one userdata is inserted at the top of every random access point
    others    reserved

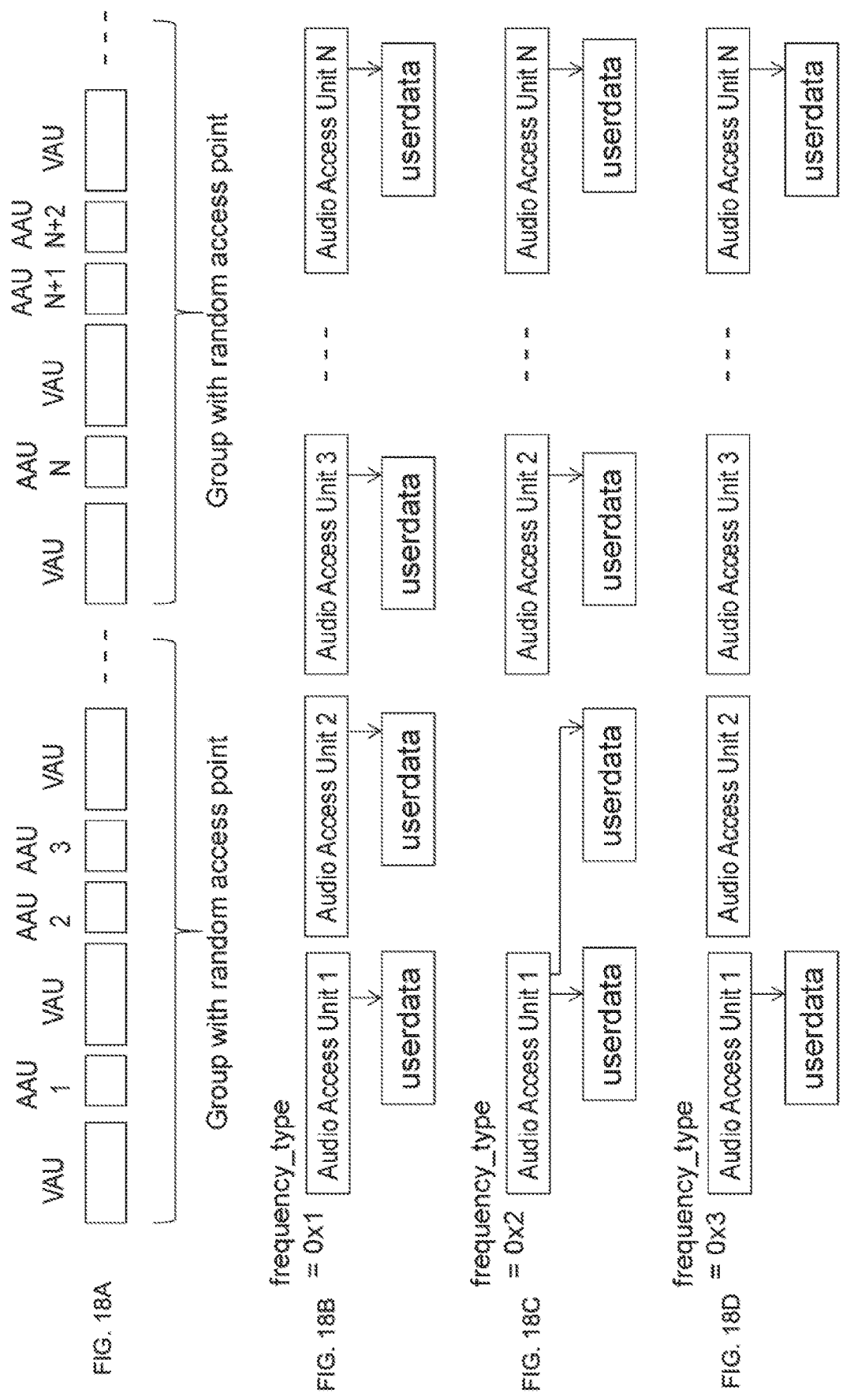

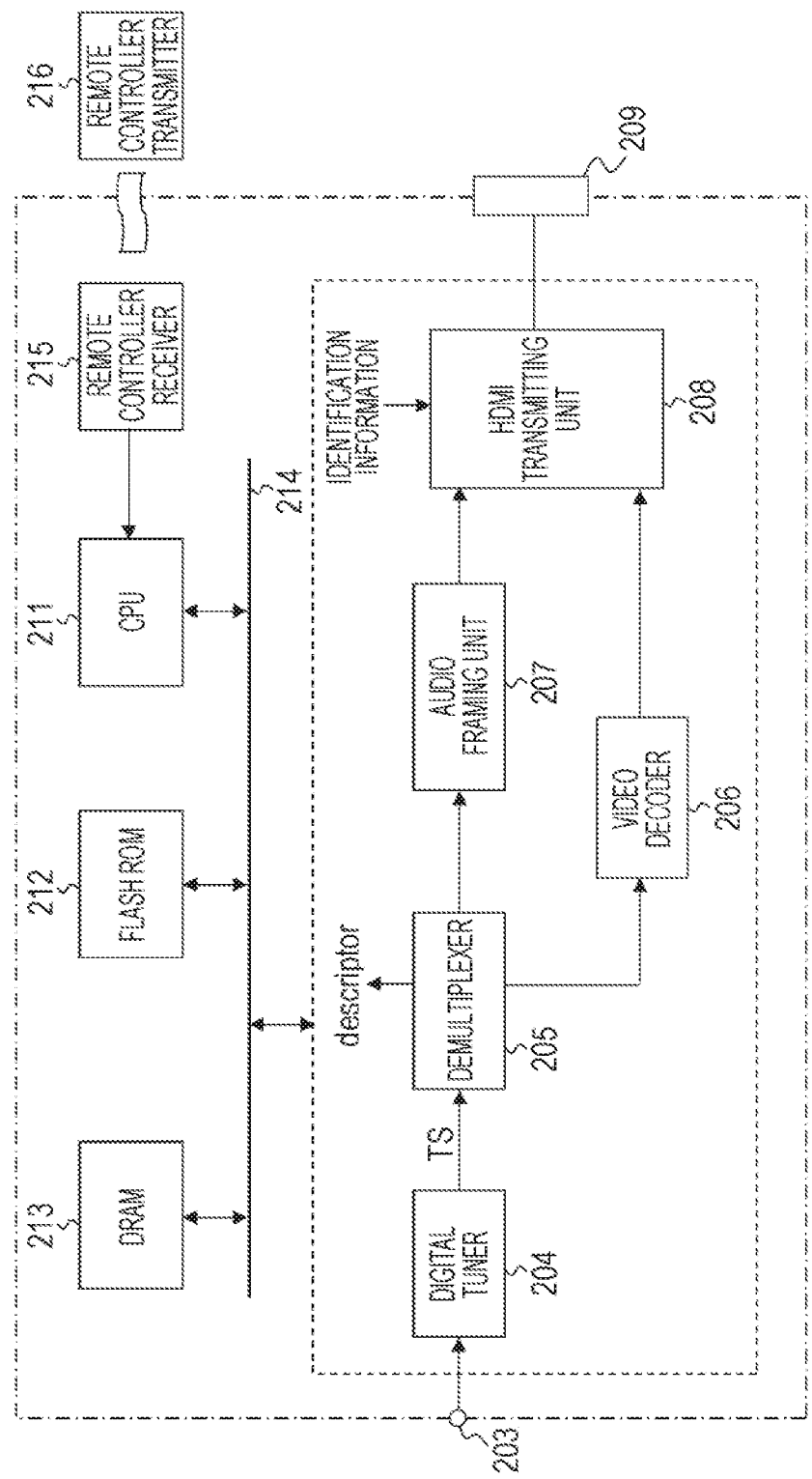

FIG. 21

EXEMPLARY STRUCTURE OF Audio InfoFrame packet

| Byte# | 7 | 6 | 5 | 4 | 3 | 2 | 1 | 0 |
|---|---|---|---|---|---|---|---|---|
| 0 | Packet Type = 0x84 | | | | | | | |
| 1 | Version | | | | | | | |
| 2 | 0 | | | Length = 0x0A | | | | |
| 3 | Checksum | | | | | | | |
| 4 | CT3 | CT2 | CT1 | CT0 | Rsvd(0) | CC2 | CC1 | CC0 |
| 5 | Reserved (0) | | Userdata presence_flg | SF2 | SF1 | SF0 | SS1 | SS0 |
| 6 | Format depends on coding type | | | | | | | |
| 7 | CA7 | CA6 | CA5 | CA4 | CA3 | CA2 | CA1 | CA0 |
| 8 | DM_INH | LSV3 | LSV2 | LSV1 | LSV0 | Rsvd (0) | LFEPBL1 | LFEPBL0 |
| 9 | Metadata_type | | | coordinated_control_flag | Rsvd (0) | frequency_type | | |
| 10 | Reserved (0) | | | | | | | |
| 11 | Reserved (0) | | | | | | | |
| 12 | Reserved (0) | | | | | | | |
| 13 | Reserved (0) | | | | | | | |
| 14...30 | NA Reserved (0) | | | | | | | |

TRANSMISSION DEVICE, TRANSMISSION METHOD, RECEPTION DEVICE, AND RECEPTION METHOD

CROSS REFERENCE TO RELATED APPLICATIONS

The present application is a continuation application of U.S. patent application Ser. No. 14/913,791, filed on Feb. 23, 2016, which is a U.S. National Phase of International Patent Application No. PCT/JP2015/069781 filed on Jul. 9, 2015, and which claims priority benefit of Japanese Patent Application No. JP 2014-147308 filed in the Japan Patent Office on Jul. 18, 2014. Each of the above-referenced applications is hereby incorporated herein by reference in its entirety.

TECHNICAL FIELD

The present technology relates to a transmission device, a transmission method, a reception device, and a reception method, and more particularly, to a transmission device that inserts metadata into an audio stream and transmits the resulting audio stream, and the like.

BACKGROUND ART

In the past, a technique of inserting metadata into an audio stream and transmitting the resulting audio stream was proposed (for example, see Patent Document 1).

CITATION LIST

Patent Document

Patent Document 1: Japanese Patent Application Laid-Open No. 2012-010311

SUMMARY OF THE INVENTION

Problems to be Solved by the Invention

Metadata is defined in a user data region of an audio stream, for example. However, metadata is not necessarily inserted into all audio streams.
It is an object of the present technology to enable a reception side to easily recognize that metadata is inserted into an audio stream and thus improve convenience of a process.

Solutions to Problems

A concept of the present technology lies in a transmission device, including: a transmitting unit that transmits a container of a predetermined format including an audio stream into which metadata is inserted; and
an information inserting unit that inserts identification information indicating that the metadata is inserted into the audio stream into a layer of the container.
In the present technology, a transmitting unit transmits a container of a predetermined format including an audio stream into which metadata is inserted. An information inserting unit inserts identification information indicating that the metadata is inserted into the audio stream into a layer of the container.
For example, the metadata may include network access information. In this case, for example, the network access information may be network access information used for acquiring media information related to image data included in a video stream included in the container from a server on a network.
Further, for example, the metadata may include reproduction control information of media information. In this case, for example, the media information may be media information related to image data included in a video stream included in the container.
As described above, in the present technology, the identification information indicating that the metadata is inserted into the audio stream is inserted into the layer of the container. Thus, at the reception side, it is possible to easily recognize that the metadata is inserted into the audio stream and acquire the metadata reliably without waste by performing the process of extracting the metadata inserted into the audio stream based on the recognition.
In the present technology, for example, information of an encoding scheme of audio data in the audio stream may be added to the identification information. As this information is added, at the reception side, it is possible to easily detect the encoding scheme of the audio data in the audio stream.
Further, in the present technology, for example, type information indicating a type of the metadata may be added to the identification information. As this information is added, at the reception side, it is possible to easily detect a type of metadata, that is, what metadata it is and determine whether or not the metadata is acquired, for example.
Further, in the present technology, for example, flag information indicating whether or not the metadata is inserted into only the audio stream may be added to the identification information. As this information is added, at the reception side, it is possible to easily detect whether or not the metadata is inserted into only the audio stream.
Further, in the present technology, for example, type information indicating a type of an insertion frequency of the metadata into the audio stream may be added to the identification information. As this information is added, at the reception side, it is possible to easily detect the insertion frequency of the metadata into the audio stream.
Further, another concept of the present technology lies in a reception device, including:
a receiving unit that receives a container of a predetermined format including an audio stream into which metadata is inserted, wherein identification information indicating that the metadata is inserted into the audio stream is inserted into a layer of the container; and
a transmitting unit that transmits the audio stream to an external device via a predetermined transmission path together with the identification information indicating that the metadata is inserted into said audio stream.
In the present technology, a receiving unit receives a container of a predetermined format including an audio stream into which metadata is inserted. Identification information indicating that the metadata is inserted into the audio stream is inserted into a layer of the container. A transmitting unit transmits the audio stream to an external device via a predetermined transmission path together with the identification information indicating that the metadata is inserted into the audio stream.
For example, the transmitting unit may transmit the audio stream and the identification information to the external device by inserting the audio stream and the identification information into a blanking period of time of image data obtained by decoding a video stream included in the container and transmitting the image data to the external device.

In this case, for example, the predetermined transmission path may be a high definition multimedia interface (HDMI) cable.

As described above, in the present technology, the audio stream into which the metadata is inserted is transmitted to the external device together with the identification information indicating that the metadata is inserted into the audio stream. Thus, at the external device side, it is possible to easily recognize that the metadata is inserted into the audio stream and acquire the metadata reliably without waste by performing the process of extracting the metadata inserted into the audio stream based on the recognition.

Further, another concept of the present technology lies in a reception device, including:

a receiving unit that receives an audio stream from an external device via a predetermined transmission path together with identification information indicating that metadata is inserted into the audio stream;

a metadata extracting unit that decodes the audio stream based on the identification information and extracts the metadata; and a processing unit that performs a process using the metadata.

In the present technology, a receiving unit receives an audio stream from an external device via a predetermined transmission path together with identification information indicating that metadata is inserted into the audio stream. A metadata extracting unit decodes the audio stream based on the identification information and extracts the metadata. A processing unit performs a process using the metadata.

For example, the metadata may include network access information, and the processing unit may access a predetermined server on a network based on the network access information, and may acquire predetermined media information. Further, for example, the predetermined transmission path may be a high definition multimedia interface (HDMI) cable.

As described above, in the present technology, the metadata is extracted from the audio stream based on the identification information received together with the audio stream and used for a process. Thus, it is possible to acquire the metadata inserted into the audio stream reliably without waste and execute the process using the metadata appropriately.

In the present technology, for example, an interface unit that transmits the audio stream to an external speaker system may further be included. In this case, it is possible to decode the audio stream through the external speaker system and output the sound through the external speaker system.

Further, another concept of the present technology lies in a reception device, including:

a receiving unit that receives a container of a predetermined format including an audio stream into which metadata is inserted, wherein identification information indicating that the metadata is inserted into the audio stream is inserted into a layer of the container; and a metadata extracting unit that decodes the audio stream based on the identification information and extracts the metadata; and a processing unit that performs a process using the metadata.

In the present technology, a receiving unit receives a container of a predetermined format including an audio stream into which metadata is inserted. Identification information indicating that the metadata is inserted into the audio stream is inserted into a layer of the container. A data extracting unit decodes the audio stream based on the identification information and extracts the metadata. A processing unit performs a process using the metadata.

As described above, in the present technology, the metadata is extracted from the audio stream based on the identification information inserted into the container and used for a process. Thus, it is possible to acquire the metadata inserted into the audio stream reliably without waste and execute the process using the metadata appropriately.

Effects of the Invention

According to the present technology, a reception side can easily recognize that metadata is inserted into an audio stream. The effect described herein is merely an example and not necessarily limited and may include any effect described in the present disclosure.

BRIEF DESCRIPTION OF DRAWINGS

FIG. 1 is a block diagram illustrating an exemplary configuration of an image display system according to an embodiment.

FIG. 2 is a block diagram illustrating an exemplary configuration of a stream generating unit with which a broadcast transmission device is equipped.

FIG. 6 is a diagram illustrating a configuration of "data stream element (DSE)" into which metadata MD is inserted when a compression format is AAC.

FIG. 7 is a diagram for describing an example of a general-purpose metadata syntax.

FIG. 8 is a diagram for describing an example of the general-purpose metadata syntax.

FIG. 9 is a diagram for describing an example of the general-purpose metadata syntax.

FIG. 10 is a diagram illustrating main data specifying content in the general-purpose metadata syntax.

FIG. 13 is a diagram illustrating a syntax of "metadata_linking_Packet( )."

FIG. 14 is a diagram illustrating main data specifying content of "metadata_linking_Packet( )."

FIG. 16 illustrates an exemplary structure of an audio user data descriptor.

FIG. 17 illustrates content of main information in an exemplary structure of the audio user data descriptor.

FIGS. 18A, 18B, 18C, and 18D illustrate diagrams for describing an arrangement example of video and audio access units in a transport stream and an insertion frequency of metadata in an audio stream.

FIG. 20 is a block diagram illustrating an exemplary configuration of a set top box configuring the image display system.

FIG. 21 is a diagram illustrating an exemplary structure of an audio InfoFrame packet arranged in a data island period.

MODE FOR CARRYING OUT THE INVENTION

Figure 3:
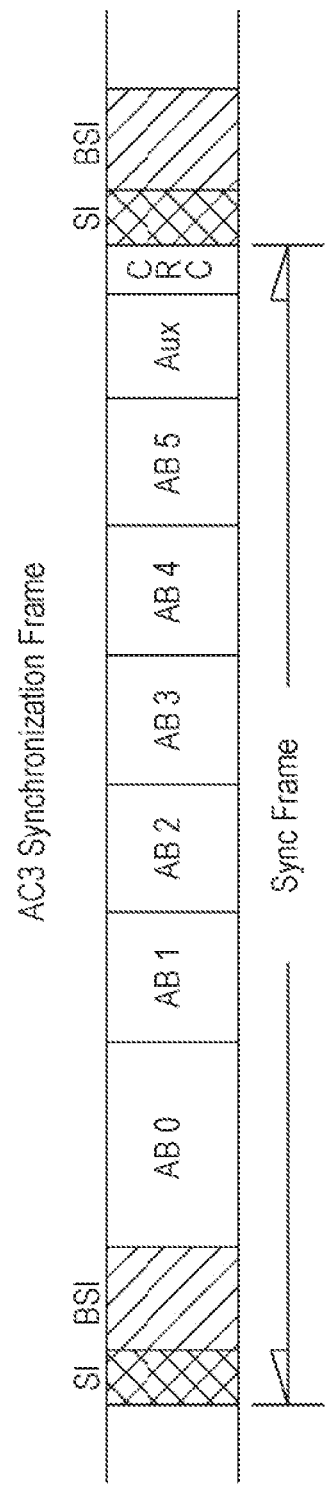
FIG. 3 is a diagram illustrating a structure of a frame (AC3 synchronization frame) of AC3.

Hereinafter, modes (hereinafter, referred to as "embodiments") for carrying out the invention will be described. A description will proceed in the following order.
1. Embodiments
2. Modified examples

1. EMBODIMENTS

[Exemplary Configuration of Image Display System]

FIG. 1 illustrates an exemplary configuration of an image display system 10 according to an embodiment. The image display system 10 includes a broadcast transmission device 100, a set top box (STB) 200, and a television receiver (TV) 300. The set top box 200 is connected with the television receiver 300 via a high definition multimedia interface (HDMI) cable 400. "HDMI" is a registered trademark.

The broadcast transmission device 100 transmits a transport stream TS through a broadcast wave. The transport stream TS includes a video stream and an audio stream. The broadcast transmission device 100 inserts metadata into the audio stream. Examples of the metadata include network access information and reproduction control information of media information.

The broadcast transmission device 100 inserts identification information indicating that the metadata is inserted into the audio stream into a layer of a container. For example, the broadcast transmission device 100 inserts the identification information into the audio elementary stream loop under control of a program map table (PMT) as a descriptor.

The broadcast transmission device 100 adds information of an encoding scheme of audio data in the audio stream, type information indicating a type of metadata, flag information indicating whether or not the metadata is inserted into only the audio stream, type information indicating a type of insertion frequency of metadata into the audio stream, and the like to the identification information.

The set top box 200 receives the transport stream TS transmitted from the broadcast transmission device 100 through the broadcast wave. As described above, the transport stream TS includes the video stream and the audio stream, and the metadata is inserted into the audio stream.

The set top box 200 transmits the audio stream to the television receiver 300 via the HDMI cable 400 together with the identification information indicating that the metadata is inserted into the audio stream.

Here, the set top box 200 transmits the audio stream and the identification information to the television receiver 300 by inserting the audio stream and the identification information into a blanking period of time of image data obtained by decoding the video stream and transmitting the image data to the television receiver 300. For example, the set top box 200 inserts the identification information into an audio InfoFrame packet.

The television receiver 300 receives the audio stream from the set top box 200 via the HDMI cable 400 together with the identification information indicating that the metadata is inserted into the audio stream. In other words, the television receiver 300 receives the image data in which the audio stream and the identification information are inserted into the blanking period of time from the set top box 200. The television receiver 300 decodes the audio stream based on the identification information, extracts the metadata, and performs a process using the metadata.

[Stream Generating Unit of Broadcast Transmission Device]

FIG. 2 illustrates an exemplary configuration of a stream generating unit 110 with which the broadcast transmission device 100 is equipped. The stream generating unit 110 includes a control unit 111, a video encoder 112, an audio encoder 113, and a multiplexer 114.

The control unit 111 includes a CPU 111a, and controls the respective units of the stream generating unit 110. The video encoder 112 performs encoding such as MPEG2, H.264/AVC, or H.265/HEVC on image data SV, and generates a video stream (a video elementary stream). Examples of the image data SV include image data reproduced from a recording medium such as a HDD and live image data obtained by a video camera.

The audio encoder 113 performs encoding according to a compression format such as AC3, AAC, or USAC on audio data SA, and generates an audio stream (an audio elementary stream). The audio data SA is audio data corresponding to the image data SV, and examples of the audio data SA include audio data reproduced from a recording medium such as a HDD or live audio data obtained by a microphone.

The audio encoder 113 includes an audio encoding block unit 113a and an audio framing unit 113b. An encoded block is generated through the audio encoding block unit 113a and framed through the audio framing unit 113b. In this case, an encoded block and framing differ according to a compression format.

The audio encoder 113 inserts metadata MD into the audio stream under control of the control unit 111. In this embodiment, the metadata MD includes network access information (a URL or network information) for a connection to a server on a network and reproduction control information (start/wait/resume/stop) of media information after a server connection. For example, the network access information is information for acquiring the media information related to the image data included in the video stream from the server on the network. Here, the metadata MD is embedded in a user data region of the audio stream.

The control unit 111 supplies the metadata MD to the audio encoder 113, and supplies size information for embedding the metadata MD in the user data region. Then, the control unit 111 performs control such that the metadata MD is embedded in the user data region of the audio stream.

For example, when the compression format is AC3, the control unit 111 supplies information of a size S (=frmsizcod−AUXDATA) to the audio encoder 113. Here, the size S is a size of an audio frame of AC3, and a value corresponding to a bit rate and a sampling frequency is specified.

For example, when the bit rate is 128 kbps, and the sampling frequency is 32 kHz, the size is 384*2 bytes. For example, when the bit rate is 128 kbps, and the sampling frequency is 44.1 kHz, the size is 279*2 bytes. For example, when the bit rate is 128 kbps, and the sampling frequency is 48 kHz, the size is 256*2 bytes.

FIG. 3 illustrates a structure of a frame (AC3 synchronization frame) of AC3 although a detailed description is omitted. The audio encoder 113 sets the size S as a target value, and encodes the audio data SA so that a total size of "mantissa data" of "Audblock 5," "AUX," and "CRC" does not exceed ⅜ of the total size. Then, the metadata MD is inserted into an area of "AUX," CRC is performed, and thus a stream is completed.

Figures 4, 5:
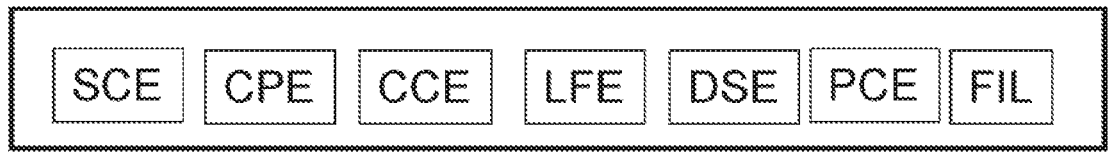
FIG. 4 is a diagram illustrating a structure of a frame (Raw_data_block) including audio data of 1024 samples of AAC.
FIG. 5 is a diagram illustrating a configuration of "AUXILIARY DATA (AUX)" into which metadata MD is inserted when a compression format is AC3.

Further, for example, when the compression format is AAC, the control unit 111 supplies information of a size DSE_S=cnt of a data stream element (DSE) into which the metadata MD is inserted to the audio encoder 113. FIG. 4 illustrates a structure of a frame (Raw_data_block) including audio data of 1024 samples of AAC although a detailed description is omitted. The audio encoder 113 completes a stream by encoding the audio data SA and adding the DSE into which the metadata MD is inserted.

The audio encoder 113 may perform encoding in twice. In this case, the audio encoder 113 initially performs normal encoding, that is, encoding in which there is neither a DSE nor an AUX, and then inserts the metadata MD into a DSE or an AUX of a size which is reserved in advance and performs encoding again.

As described above, the metadata MD is embedded in the user data region of the audio stream (the "AUX" in the case of AC3 or the "DSE" in the case of AAC), which will be described in detail later. Although a detailed description is omitted, when the compression format is USAC, the metadata MD is similarly embedded in the user data region of the audio stream.

Referring back to FIG. 2, the multiplexer 114 obtains a transport stream TS serving as a multiplexed stream by converting the video stream output from the video encoder 112 and the audio stream output from the audio encoder 113 into a PES packet, performing conversion into a transport packet, and performing multiplexing.

The multiplexer 114 inserts the identification information indicating that the metadata MD is inserted into the audio stream under control of the program map table (PMT). An audio user data descriptor (audio_userdata_descriptor) is used for insertion of the identification information. This descriptor will be described in detail later.

An operation of the stream generating unit 110 illustrated in FIG. 2 will briefly be described. The image data SV is supplied to the video encoder 112. The video encoder 112 performs encoding such as H.264/AVC or H.265/HEVC on the image data SV, and generates the video stream including encoded video data.

The audio data SA is supplied to the audio encoder 113. The audio encoder 113 performs encoding such as AC3, AAC, or USAC on the audio data SA, and generates the audio stream.

At this time, the metadata MD and the size information for embedding the metadata MD in the user data region are supplied from the control unit 111 to the audio encoder 113. Then, the audio encoder 113 embeds the metadata MD in the user data region of the audio stream (for example, the "AUX" in the case of AC3, the "DSE" in the case of AAC, or the like).

The video stream generated by the video encoder 112 is supplied to the multiplexer 114. The audio stream that is generated by the audio encoder 113 and includes the metadata MD embedded in the user data region thereof is supplied to the multiplexer 114. Then, the multiplexer 114 obtains the transport stream TS as transmission data by packetizing the streams supplied from the encoders and performing multiplexing.

[Details of Embedding of Metadata MD]

The embedding of the metadata MD in the user data region of the audio stream will be further described. As described above, when the compression format is AC3, the metadata MD is inserted a region of "AUX (AUXILIARY DATA)."

FIG. 5 illustrates a configuration (syntax) of "AUX (AUXILIARY DATA)." When "auxdatae" is "1," "aux data" is enabled, and data of a size indicated by 14 bits (bit units) of "auxdatal" is defined in "auxbits." At this time, the size of "audbits" is described in "nauxbits." In the present technology, "metadata( )" is defined as space of "auzbits."

FIG. 6 illustrates a configuration (syntax) of the "data stream element (DSE)." "element_instance_tag" is configured with 4 bits and indicates a data type in "data_stream_element," when the DSE is a unified user data, a value thereof may be "0." "Data_byte_align_flag" is set to "1," and the entire DSE is byte-aligned. A value of "count" or "esc_count" indicating the number of additional bytes is appropriately decided according to the size of the user data. In the present technology, "metadata( )" is defined as space of "data_stream_byte."

FIGS. 7 to 9 illustrate a general-purpose metadata syntax. FIG. 10 illustrates main data specifying content (semantics) in the general-purpose metadata syntax.

An 8-bit field of "sync_byte" is regarded as a unique word indicating a metadata container. An 8-bit field of "metadata_type" indicates type information of metadata. Based on the type information, it is possible to selectively transmit a plurality of types of metadata. For example, "00000001" indicates that transmitted metadata is access information of another service to collaborate with.

An 11-bit field of "metadata_length" indicates the number of subsequent bytes. A 3-bit field of "metadata_ID" indicates an identifier identifying a kind in a type of metadata. Based on this identifier, it is possible to simultaneously transmit a plurality of kinds of information having the same type.

A 3-bit field of "metadata_counter" is count information indicating what number divisional information is when a series of metadata is divided and transmitted. The count information is a count value of a counter that increases in units of audio frames. A 1-bit field of "metadata_start_flag" indicates whether or not it is first divisional information when a series of metadata (metadata packets) is divided and transmitted. For example, "1" indicates that it is the first divisional information, and "0" indicates that it is divisional information subsequent to divisional information of a previous frame other than the first divisional information.

Figure 11:
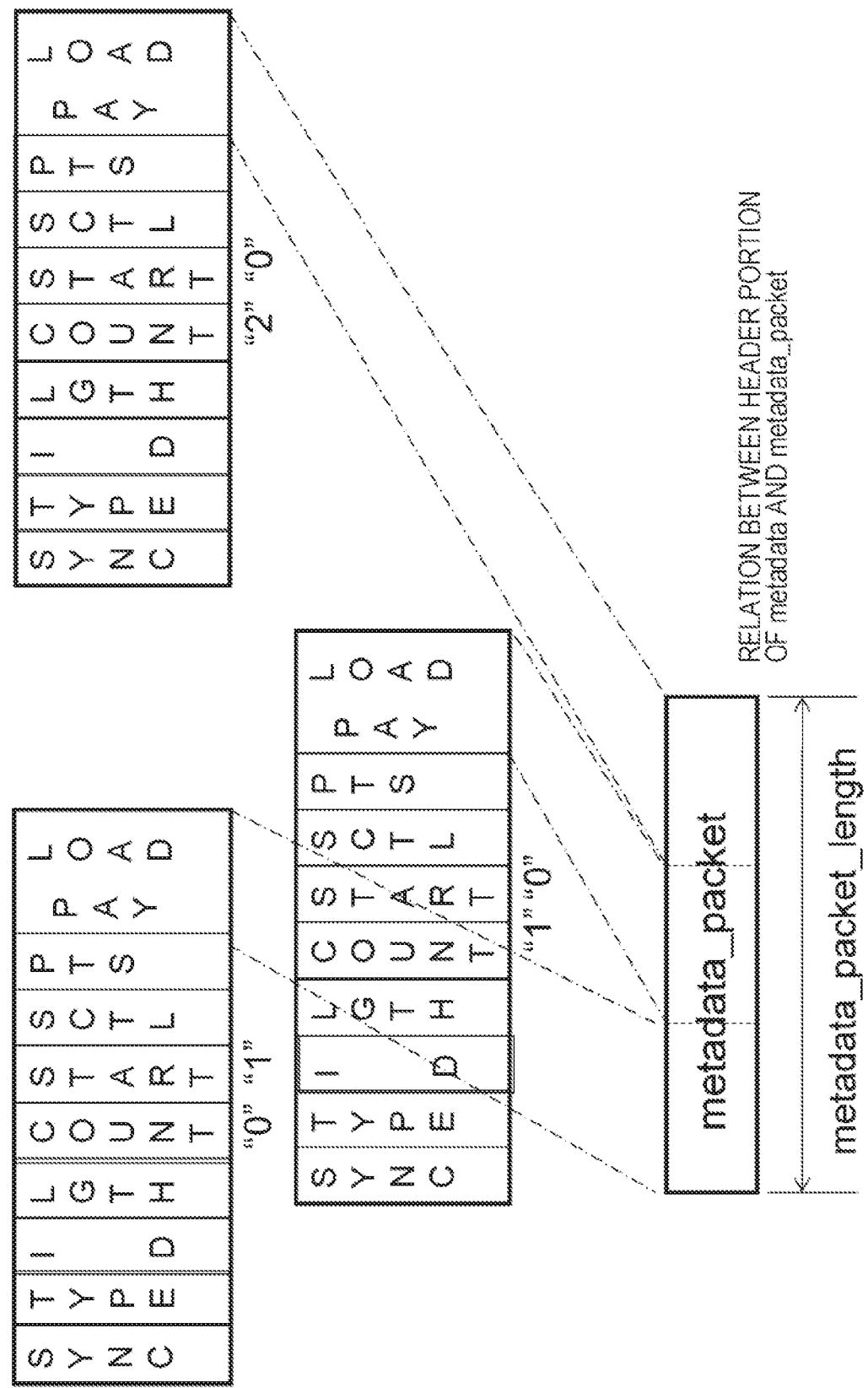
FIG. 11 is a diagram illustrating a change example of "metadata_counter" and "metadata_start_flag" when a series of metadata (metadata packets) is divided and transmitted.

FIG. 11 illustrates a change example of "metadata_counter" and "metadata_start_flag" when a series of metadata (metadata packets) is divided into three, and the three pieces of divisional information are embedded in the user data regions of the three audio frames. In the first audio frame, "metadata_counter=0" and "metadata_start_flag=1" are set. In the next audio frame, "metadata_counter=1" and "metadata_start_flag=0" are set. In the last audio frame, "metadata_counter=2" and "metadata_start_flag=0" are set.

Referring back to FIG. 7, a 1-bit field of "sync_control_flag" indicates whether or not the metadata is synchronization-managed. "1" indicates that the metadata is synchronization-managed through a PTS in "PTS_management( )." "0" indicates that the metadata is not synchronization-managed. When "sync_control_flag" is "1," there is "PTS_management( )."

Figure 12:
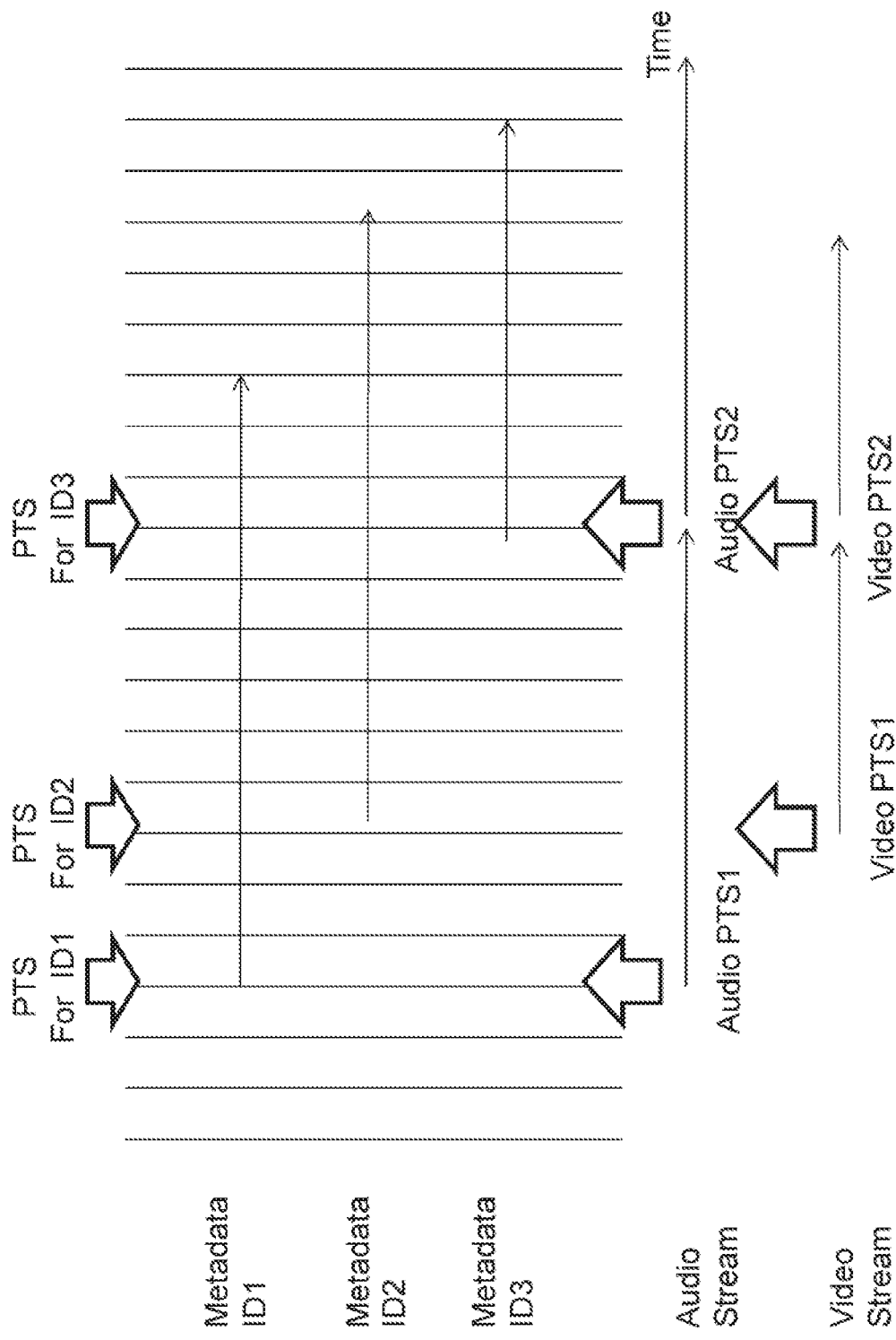
FIG. 12 is a diagram illustrating an example in which a plurality of pieces of metadata are managed to be synchronized with synchronization targets.

FIG. 8 illustrates a structure (syntax) of "PTS_management( )," and there is time information indicated by PTS [32-0] of 33 bits. FIG. 12 illustrates an example in which a plurality of pieces of metadata are managed to be synchronized with synchronization targets. In this example, metadata (ID1) is synchronized with an audio PTS1, metadata (ID2) is synchronized with a video PTS1, and metadata (ID3) is synchronized with an audio PTS2 and a video PTS2.

Referring back to FIG. 7, "data_byte" corresponding to the number of bytes indicated by "metadata_length" configures the entire metadata packet "Metadata_packet( )" or any one of a plurality of pieces of divisional information obtained by dividing the metadata packet "Metadata_packet( )."

FIG. 9 illustrates a configuration (syntax) of the metadata packet "metadata_packet( )." An 8-bit field of "packet_type" indicates type information of metadata, similarly to the 8-bit field of "metadata_type" in the metadata "metadata( )" (see FIG. 7). A 16-bit field of "metadata_packet_length" indicates the number of subsequent bytes. The metadata is described in "data_byte" corresponding to the number of bytes indicated by "metadata_packet_length."

Next, "metadata_packet( )" when metadata is access information (metadata for linking service) of another service, that is, "metadata_linking_Packet( )" will be described. In the case of a connection to a server of a link service or the like, as a supply source server of content or a service, individual characters of "http://www/xxx/com/yyy.zzz" become "unit_data" by character data. Further, other control codes are included in "unit_data" based on a protocol that is separately defined.

FIG. 13 illustrates a syntax of "metadata_linking_packet( )" FIG. 14 illustrates main data specifying content (semantics) of "metadata_linking_packet( )." An 8-bit field of "packet_type" indicates that a type of metadata is another service access information. A 16-bit field of "metadata_linking_packet_length" indicates the number of subsequent bytes. An 8-bit field of "number_of_units" indicates the number of metadata elements.

An 8-bit field of "unit ID" indicates an identifier identifying a unit. An 8-bit field of "unit_size" indicates a size of a metadata element (metadata_element). An 8-bit field of "extended_size" indicates an extension of a unit size (unit_size). When the unit size (unit_size) exceeds 254, unit_size=255 is set, and an extended size (exended_size) is input. An 8-bit field of "unit_data" indicates a metadata element (metadata_element).

Figure 15:
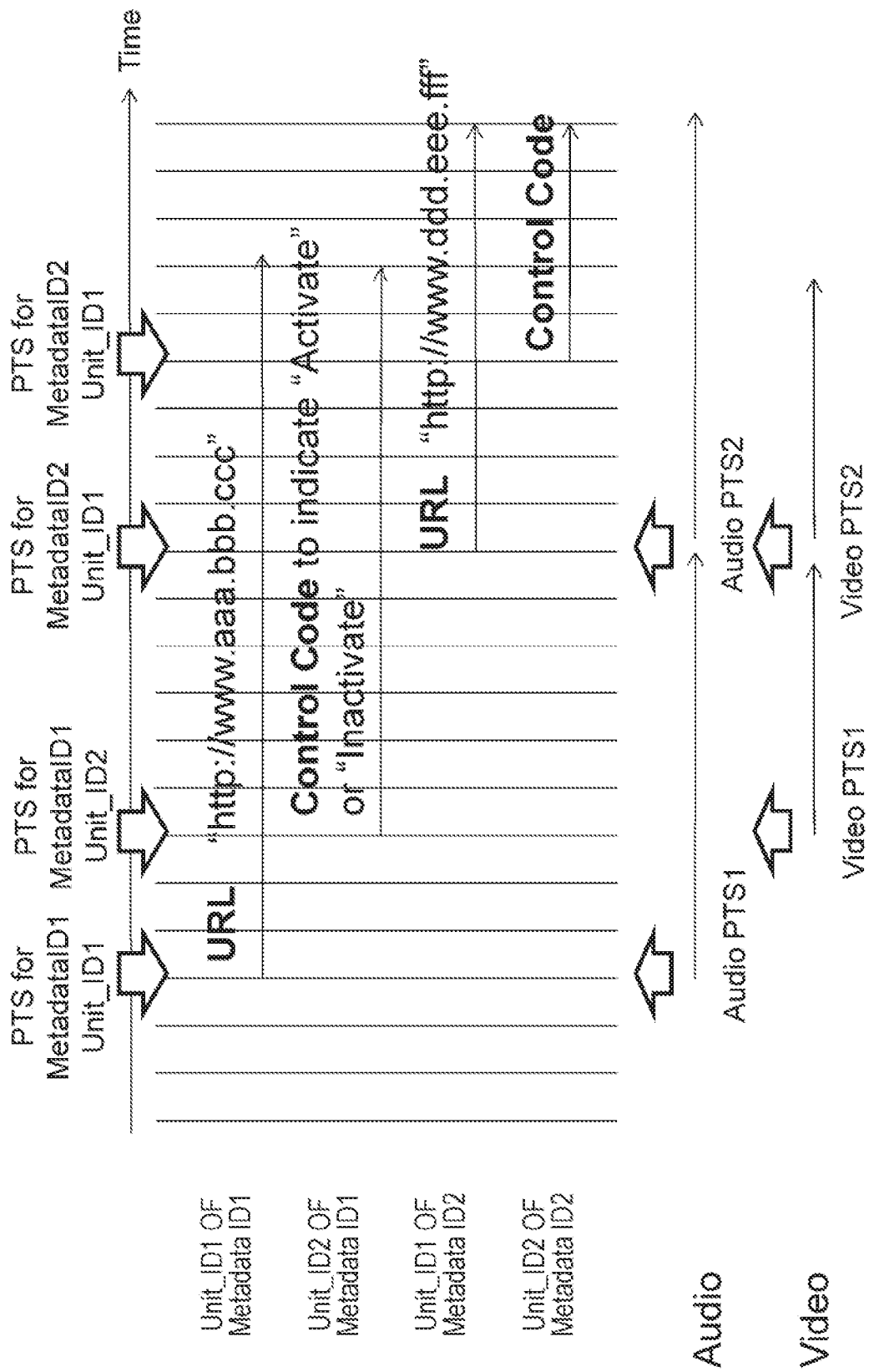
FIG. 15 is a diagram illustrating an example in which a plurality of metadata units are managed to be synchronized with synchronization targets.

FIG. 15 illustrates an example in which a plurality of metadata units are managed to be synchronized with synchronization targets. In this example, a unit (Unit_ID1) of the metadata (ID1) is information for designating a link server by a URL, and a unit (Unit_ID2) of the metadata (ID1) is a command group for controlling "Activate" or "Inactivate." In this example, a unit (Unit_ID1) of the metadata (ID2) is information for designating a link server by a URL, and a unit (Unit_ID2) of the metadata (ID2) is a command group for performing control on a link service such as "Activate" or "Inactivate."

The unit (Unit_ID1) of the metadata (ID1) is synchronized with the audio PTS1. The unit (Unit_ID2) of the metadata (ID1) is synchronized with the video PTS1. The unit (Unit_ID1) of the metadata (ID2) is synchronized with the audio PTS2 and the video PTS2.

[Details of Audio User Data Descriptor]

FIG. 16 illustrates an exemplary structure (syntax) of the audio user data descriptor (audio_userdata_descriptor). FIG. 17 illustrates content of main information (semantics) in the exemplary structure.

An 8-bit field of "descriptor_tag" indicates a descriptor type. Here, an 8-bit field of "descriptor_tag" indicates the audio user data descriptor. An 8-bit field of "descriptor_length" indicates a length (size) of a descriptor, and indicates the number of subsequent bytes as a length of a descriptor.

An 8-bit field of "audio_codec_type" indicates an audio encoding scheme (a compression format). For example, "1" indicates "MPEG4 AAC," "2" indicates "USAC," and "3" indicates "AC3." As this information is added, at the reception side, it is possible to easily detect an encoding scheme of audio data in the audio stream.

A 3-bit field of "metadata_type" indicates a type of metadata. For example, "1" indicates that metadata is access information of another service to collaborate with. As this information is added, at the reception side, it is possible to easily detect a type of metadata, that is, what metadata it is and determine whether or not the metadata is acquired, for example.

1-bit flag information of "coordinated_control_flag" indicates whether or not the metadata is inserted into only the audio stream. For example, "1" indicates that the metadata is inserted into a stream of another component as well, and "0" indicates that the metadata is inserted into only the audio stream. As this information is added, at the reception side, it is possible to easily detect whether or not the metadata is inserted into only the audio stream.

A 3-bit field of "frequency_type" indicates a type of insertion frequency of the metadata into the audio stream. For example, "1" indicates that one user data (metadata) is inserted into each audio access unit. "2" indicates that one or more pieces of user data (metadata) are inserted into each audio access unit. "3" indicates that at least one user data (metadata) is inserted into a first audio access unit for each group including a random access point. As this information is added, at the reception side, it is possible to easily detect the insertion frequency of the metadata into the audio stream.

FIG. 18A illustrates an arrangement example of video and audio access units in the transport stream TS. "VAU" stands for a video access unit. "AAU" stands for an audio access unit. FIG. 18B illustrates that one user data (metadata) is inserted into each audio access unit when "frequency_type=1" is set.

FIG. 18C illustrates that one user data (metadata) is inserted into each audio access unit when "frequency_type=2" is set. One or more pieces of user data (metadata) are inserted into one audio access unit. FIG. 18D illustrates that at least one user data (metadata) is inserted into a first audio access unit for each group including a random access point when "frequency_type=3" is set.

[Configuration of Transport Stream TS]

Figure 19:
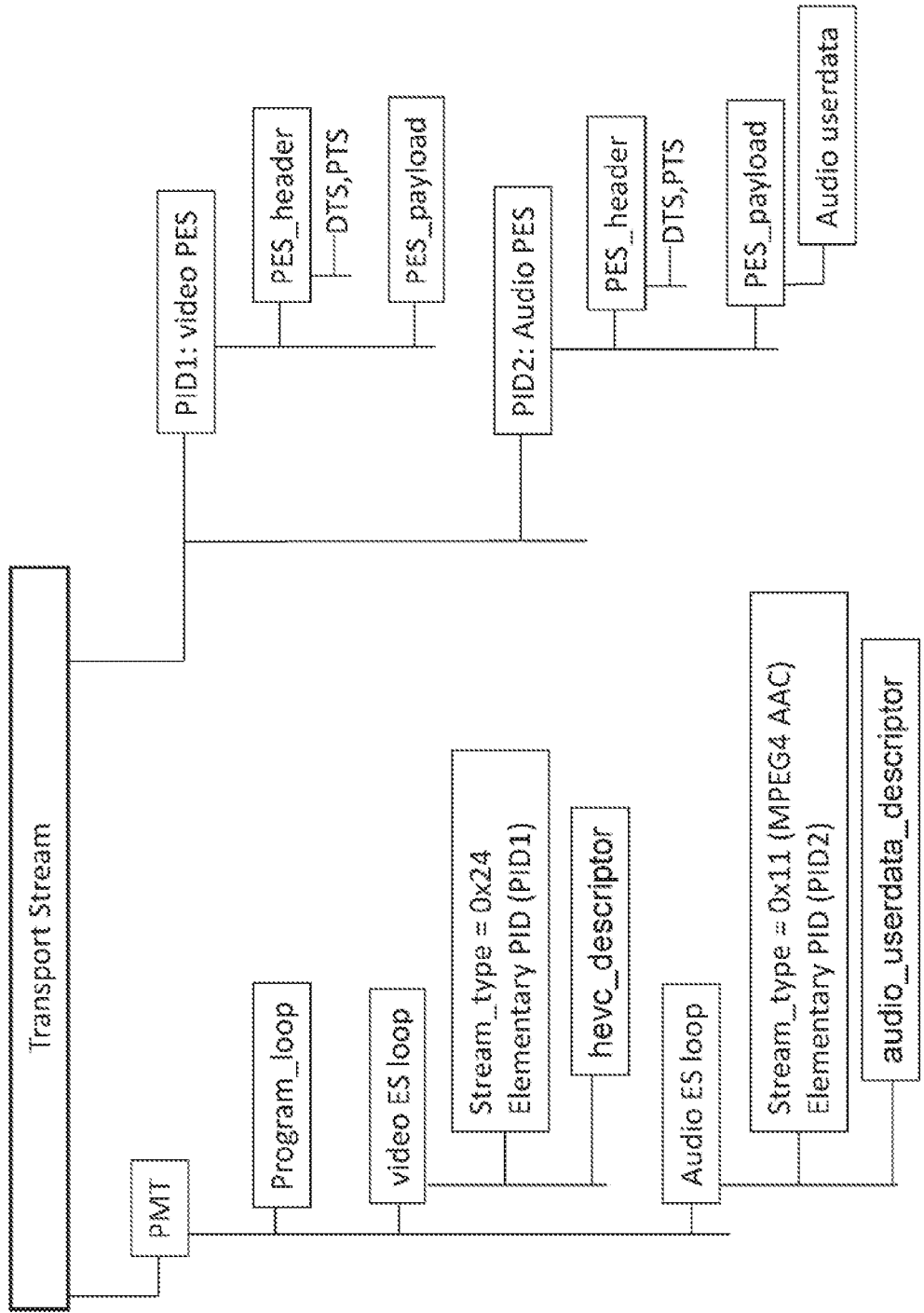
FIG. 19 is a diagram illustrating an exemplary configuration of a transport stream.

FIG. 19 illustrates an exemplary configuration of the transport stream TS. In the exemplary configuration, there is a PES packet "video PES" of a video stream indicated by PID1, and there is a PES packet "audio PES" of an audio stream indicated by PID2. The PES packet is configured with a PES header (PES_header) and a PES payload (PES_payload). Time stamps of a DTS and a PTS are inserted into the PES header. There is the user data region including the metadata in the PES payload of the PES packet of the audio stream.

The transport stream TS includes a PMT as program specific information (PSI). The PSI is information describing a program to which each elementary stream included in the transport stream belongs. The program map table (PMT) includes a program loop describing information associated with the entire program.

The PMT further includes an elementary stream loop including information associated with each elementary stream. In this exemplary configuration, there is a video elementary stream loop (a video ES loop) corresponding to the video stream, and there is an audio elementary stream loop (an audio ES loop) corresponding to the audio stream.

In the video elementary stream loop (the video ES loop), information such as a stream type and a packet identifier (PID) is arranged in association with the video stream, and a descriptor describing information associated with the video stream is arranged as well. A value of "Stream_type" of the video stream is set to "0x24," and the PID information is regarded to indicate PID1 allocated to the PES packet "video PES" of the video stream as described above. A HEVC descriptor is arranged as one of the descriptors.

In the audio elementary stream loop (the audio ES loop), information such as a stream type and a packet identifier (PID) are arranged in association with the audio stream, and a descriptor describing information associated with the audio stream is arranged as well. A value of "Stream_type" of the audio stream is set to "0x11," and the PID information is regarded to indicate PID2 allocated to the PES packet "audio PES" of the audio stream as described above. The audio user data descriptor (audio_userdata_descriptor) is arranged as one of the descriptors.

[Exemplary Configuration of Set Top Box]

FIG. 20 illustrates an exemplary configuration of the set top box 200. The set top box 200 includes an antenna terminal 203, a digital tuner 204, a demultiplexer 205, a video decoder 206, an audio framing unit 207, a HDMI transmitting unit 208, and a HDMI terminal 209. The set top box 200 includes a CPU 211, a flash ROM 212, a DRAM 213, an internal bus 214, a remote controller receiving unit 215, and a remote controller transmitter 216.

The CPU 211 controls operations of the respective units of the set top box 200. The flash ROM 212 stores control software and holds data. The DRAM 213 configures a work area of the CPU 211. The CPU 211 activates software read from the flash ROM 212 or develops data onto the DRAM 213 and activates software, and controls the respective units of the set top box 200.

The remote controller receiving unit 215 receives a remote control signal (a remote controller code) transmitted from the remote controller transmitter 216, and supplies the remote control signal (the remote controller code) to the CPU 211. The CPU 211 controls the respective units of the set top box 200 based on the remote controller code. The CPU 211, the flash ROM 212, and the DRAM 213 are connected to the internal bus 214.

The antenna terminal 203 is a terminal through which a television broadcast signal received through a reception antenna (not illustrated) is input. The digital tuner 204 processes the television broadcast signal input to the antenna terminal 203, and outputs the transport stream TS corresponding to a channel selected by the user.

The demultiplexer 205 extracts the packet of the video stream from the transport stream TS, and transfers the packet of the video stream to the video decoder 206. The video decoder 206 reconfigures the video stream from the video packet extracted by the demultiplexer 205, performs a decoding process, and obtains uncompressed image data. The demultiplexer 205 extracts the packet of the audio stream from the transport stream TS and reconfigures the audio stream. The audio framing unit 207 performs framing on the audio stream reconfigured as described above.

The demultiplexer 205 extracts various kinds of descriptors and the like from the transport stream TS, and transmits the extracted descriptors and the like to the CPU 211. Here, the descriptor also includes the audio user data descriptor serving as the identification information indicating that the metadata is inserted into the audio stream (see FIG. 16).

The HDMI transmitting unit 208 transmits the uncompressed image data obtained through the video decoder 206 and the audio stream framed by the audio framing unit 207 through the HDMI terminal 209 according to communication complying with the HDMI. The HDMI transmitting unit 208 packs the image data and the audio stream for transmission through the TMDS channel of the HDMI, and transfers the resulting data to the HDMI terminal 209.

The HDMI transmitting unit 208 inserts the identification information indicating that the metadata is inserted into the audio stream under control of the CPU 211. The HDMI transmitting unit 208 inserts the audio stream and the identification information into the blanking period of time of the image data. The HDMI transmitting unit 209 will be described in detail.

In this embodiment, the HDMI transmitting unit 208 inserts the identification information into the audio InfoFrame packet arranged in the blanking period of time of the image data. The audio InfoFrame packet is arranged in a data island period.

FIG. 21 illustrates an exemplary structure of the audio InfoFrame packet. In the HDMI, supplementary information related to a sound can be transmitted from a source device to a sink device through the audio InfoFrame packet.

"Packet Type" indicating a kind of a data packet is defined in a 0-th byte, and the audio InfoFrame packet is set to "0x84." Version information of a packet data definition is described in a 1st byte. Information indicating a packet length is described in a 2nd byte.

In this embodiment, 1-bit flag information of "userdata_presence_flag" is defined in a 5th bit of a 5th byte. When the flag information is "1," the identification information is defined in a 9th byte. 7th to 5th bits are used as a field of "metadata_type," a 4th bit is used as a field of "coordinated_control_flag," and 2nd to 0-th bits are used as a field of "frequency_type." Although a detailed description is omitted, the respective fields indicate the same information as the respective fields in the audio user data descriptor illustrated in FIG. 16.

An operation of the set top box 200 will briefly be described. The television broadcast signal input to the antenna terminal 203 is supplied to the digital tuner 204. The digital tuner 204 processes the television broadcast signal, and outputs the transport stream TS corresponding to the channel selected by the user.

The transport stream TS output from the digital tuner 204 is supplied to the demultiplexer 205. The demultiplexer 205 extracts the packet of the video elementary stream from the transport stream TS, and transfers the packet of the video elementary stream to the video decoder 206.

The video decoder 206 reconfigures the video stream from the video packet extracted by the demultiplexer 205, then performs the decoding process on the video stream, and obtains the image data. The image data is supplied to the HDMI transmitting unit 208.

The demultiplexer 205 extracts the packet of the audio stream from the transport stream TS, and reconfigures the audio stream. The audio stream is framed by the audio framing unit 207 and then supplied to the HDMI transmitting unit 208. Then, the HDMI transmitting unit 208 packs the image data and the audio stream, and transmits the resulting data from the HDMI terminal 209 to the HDMI cable 400.

The demultiplexer 205 extracts various kinds of descriptors and the like from the transport stream TS, and transfers the descriptors and the like to the CPU 211. Here, the descriptor also includes the audio user data descriptor, and the CPU 211 detects that the metadata is inserted into the audio stream based on the descriptor.

The HDMI transmitting unit 208 inserts the identification information indicating that the metadata is inserted into the audio stream into the audio InfoFrame packet arranged in the blanking period of time of the image data under control of the CPU 211. Thus, the identification information indicating that the metadata is inserted into the audio stream is transmitted from the set top box 200 to the HDMI television receiver 300.

[Exemplary Configuration of Television Receiver]

Figure 22:
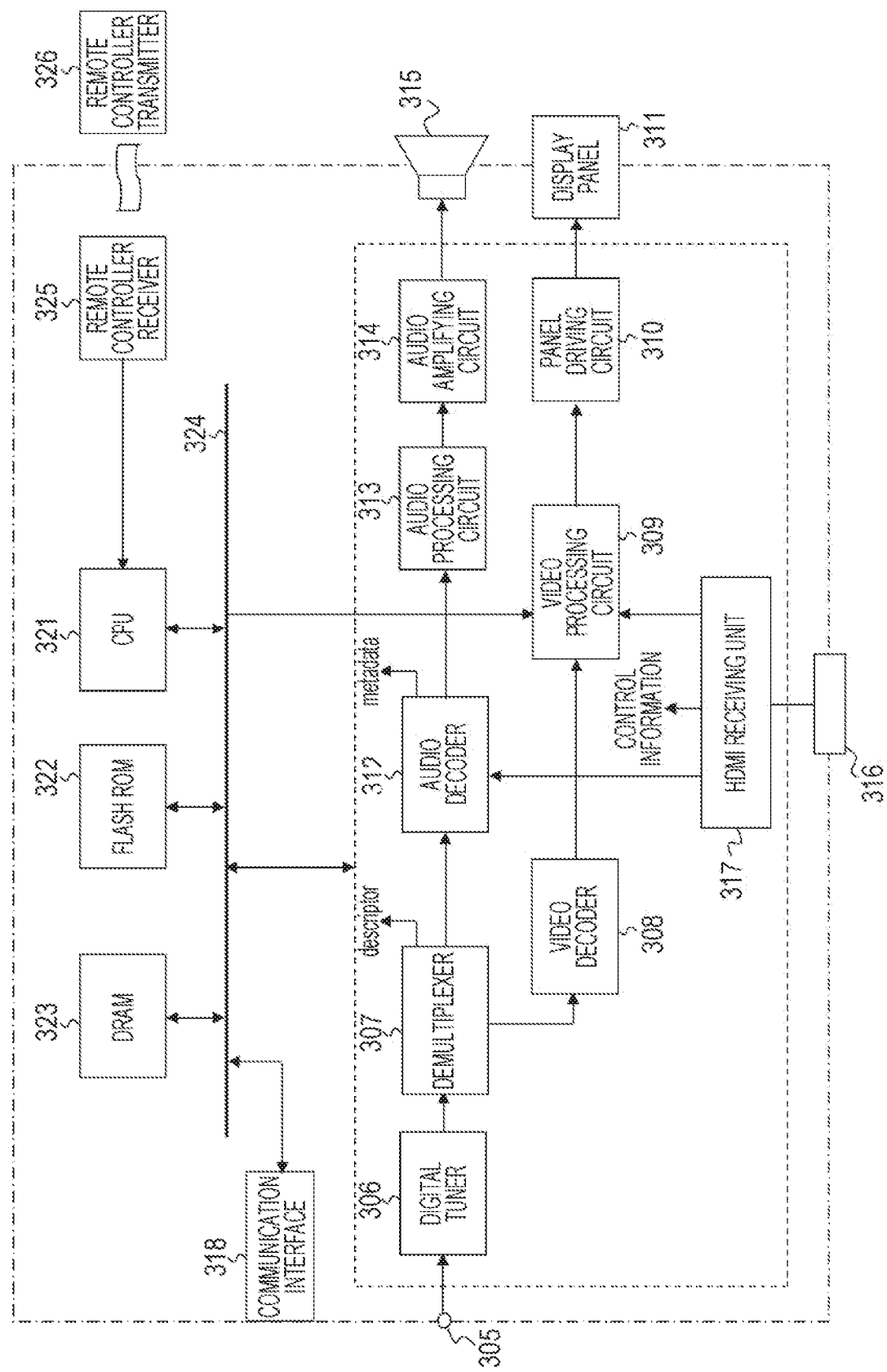
FIG. 22 is a block diagram illustrating an exemplary configuration of a television receiver configuring the image display system.

FIG. 22 illustrates an exemplary configuration of the television receiver 300. The television receiver 300 includes an antenna terminal 305, a digital tuner 306, a demultiplexer 307, a video decoder 308, a video processing circuit 309, a panel driving circuit 310, and a display panel 311.

The television receiver 300 includes an audio decoder 312, an audio processing circuit 313, an audio amplifying circuit 314, a speaker 315, a HDMI terminal 316, a HDMI receiving unit 317, and a communication interface 318. The television receiver 300 includes a CPU 321, a flash ROM 322, a DRAM 323, an internal bus 324, a remote controller receiving unit 325, and a remote controller transmitter 326.

The CPU 321 controls operations of the respective units of the television receiver 300. The flash ROM 322 stores control software and holds data. The DRAM 323 configures a work area of the CPU 321. The CPU 321 activates software read from the flash ROM 322 or develops data onto the DRAM 323 and activates software, and controls the respective units of the television receiver 300.

The remote controller receiving unit 325 receives a remote control signal (a remote controller code) transmitted from the remote controller transmitter 326, and supplies the remote control signal (the remote controller code) to the CPU 321. The CPU 321 controls the respective units of the television receiver 300 based on the remote controller code. The CPU 321, the flash ROM 322, and the DRAM 323 are connected to the internal bus 324.

The communication interface 318 performs communication with a server located on a network such as the Internet under control of the CPU 321. The communication interface 318 is connected to the internal bus 324.

The antenna terminal 305 is a terminal through which a television broadcast signal received through a reception antenna (not illustrated) is input. The digital tuner 306 processes the television broadcast signal input to the antenna terminal 305, and outputs the transport stream TS corresponding to a channel selected by the user.

The demultiplexer 307 extracts the packet of the video stream from the transport stream TS, and transfers the packet of the video stream to the video decoder 308. The video decoder 308 reconfigures the video stream from the video packet extracted by the demultiplexer 307, performs a decoding process, and obtains uncompressed image data.

The demultiplexer 205 extracts the packet of the audio stream from the transport stream TS and reconfigures the audio stream. The demultiplexer 307 extracts various kinds of descriptors and the like from the transport stream TS, and transmits the extracted descriptors and the like to the CPU 321. Here, the descriptor also includes the audio user data descriptor serving as the identification information indicating that the metadata is inserted into the audio stream (see FIG. 16). The video decoder 308 reconfigures the video stream from the video packet extracted by the demultiplexer 307, performs the decoding process, and obtains the uncompressed image data.

The HDMI receiving unit 317 receives the image data and the audio stream supplied to the HDMI terminal 316 via the HDMI cable 400 according to communication complying with the HDMI. The HDMI receiving unit 317 extracts various control information inserted into the blanking period of time of the image data, and transmits the extracted control information to the CPU 321. Here, the control information also includes the identification information that indicates that the metadata is inserted into the audio stream and is inserted into the audio InfoFrame packet (see FIG. 21). The HDMI receiving unit 317 will be described in detail later.

The video processing circuit 309 obtains a display image data by performing a scaling process, a synthesis process, and the like on the image data that is obtained through the video decoder 308 or the HDMI receiving unit 316 and the image data received from the server on the network through the communication interface 318.

The panel driving circuit 310 drives the display panel 311 based on the display image data obtained through the video processing circuit 309. The display panel 311 is configured with, for example, a liquid crystal display (LCD), an organic electroluminescence display (organic EL display), or the like.

The audio decoder 312 obtains uncompressed audio data by performing a decoding process on the audio stream that is obtained through the demultiplexer 307 or the HDMI receiving unit 317. The audio decoder 312 extracts the metadata inserted into the audio stream, and transmits the extracted metadata to the CPU 321. The CPU 321 appropriately causes the respective units of the television receiver 300 to perform a process using the metadata.

The audio processing circuit 313 performs a necessary process such as D/A conversion on the audio data obtained through the audio decoder 312. The audio amplifying circuit 314 amplifies an audio signal output from the audio processing circuit 313, and supplies the amplified audio signal to the speaker 315.

An operation of the television receiver 300 illustrated in FIG. 22 will briefly be described. The television broadcast signal input to the antenna terminal 305 is supplied to the digital tuner 306. The digital tuner 306 processes the television broadcast signal and obtains the transport stream TS corresponding to the channel selected by the user.

The transport stream TS obtained through the digital tuner 306 is supplied to the demultiplexer 307. The demultiplexer 307 extracts the packet of the video stream from the transport stream TS, and supplies the packet of the video stream to the video decoder 308. The video decoder 308 reconfigures the video stream from the video packet extracted by the demultiplexer 307, performs the decoding process, and obtains the uncompressed image data. The image data is supplied to the video processing circuit 309.

The demultiplexer 307 extracts the packet of the audio stream from the transport stream TS, and reconfigures the audio stream. The audio stream is supplied to the audio decoder 312. The demultiplexer 307 extracts various kinds of descriptors and the like from the transport stream TS, and transfers the descriptors and the like to the CPU 321.

The descriptor also includes the audio user data descriptor serving as the identification information indicating that the metadata is inserted into the audio stream. Thus, the CPU 321 controls the operation of the audio decoder 312 based on the identification information such that the metadata is extracted from the audio stream.

The HDMI receiving unit 317 receives the image data and the audio stream supplied to the HDMI terminal 316 via the HDMI cable 400 according to communication complying with the HDMI. The image data is supplied to the video processing circuit 309. The audio stream is supplied to the audio decoder 312.

The HDMI receiving unit 317 extracts various control information inserted into the blanking period of time of the image data, and transmits the extracted control information to the CPU 321. Here, the control information also includes the identification information that indicates that the metadata is inserted into the audio stream and is inserted into the audio InfoFrame packet. Thus, the CPU 321 controls the operation of the audio decoder 312 based on the identification information such that the metadata is extracted from the audio stream.

The video processing circuit 309 obtains a display image data by performing a scaling process, a synthesis process, and the like on the image data that is obtained through the video decoder 308 or the HDMI receiving unit 317 and the image data received from the server on the network through the communication interface 318. Here, when the television broadcast signal is received and processed, the video processing circuit 309 deals with the image data obtained through the video decoder 308. On the other hand, when the set top box 200 is connected through a HDMI interface, the video processing circuit 309 deals with the image data obtained through the HDMI receiving unit 317.

The display image data obtained through the video processing circuit 309 is supplied to the panel driving circuit 310. The panel driving circuit 310 drives the display panel 311 based on the display image data. As a result, the image corresponding to the display image data is displayed on the display panel 311.

The audio decoder 312 obtains the uncompressed audio data by performing the decoding process on the audio stream that is obtained through the demultiplexer 307 or the HDMI receiving unit 316. Here, when the television broadcast signal is received and processed, the audio decoder 312 deals with the audio stream obtained through the demultiplexer 307. On the other hand, when the set top box 200 is connected through the HDMI interface, the audio decoder 312 deals with the audio stream obtained through the HDMI receiving unit 317.

The audio data obtained through the audio decoder 312 is supplied to the audio processing circuit 313. The audio processing circuit 313 performs a necessary process such as D/A conversion on the audio data. The audio data is amplified by the audio amplifying circuit 314 and supplied to the speaker 315. As a result, the sound corresponding to the display image of the display panel 311 is output from the speaker 315.

The audio decoder 312 extracts the metadata inserted into the audio stream. For example, the metadata extraction process is reliably performed without waste by the CPU 321 detecting that the metadata is inserted into the audio stream based on the identification information and controlling the operation of the audio decoder 312 as described above.

The metadata extracted by the audio decoder 312 as described above is transferred to the CPU 321. The CPU 321 appropriately controls the respective units of the television receiver 300 such that the process using the metadata is performed. For example, the image data is acquired from the server on the network, and a multi-screen display is performed.

[Exemplary Configuration of HDMI Transmitting Unit and HDMI Receiving Unit]

Figure 23:
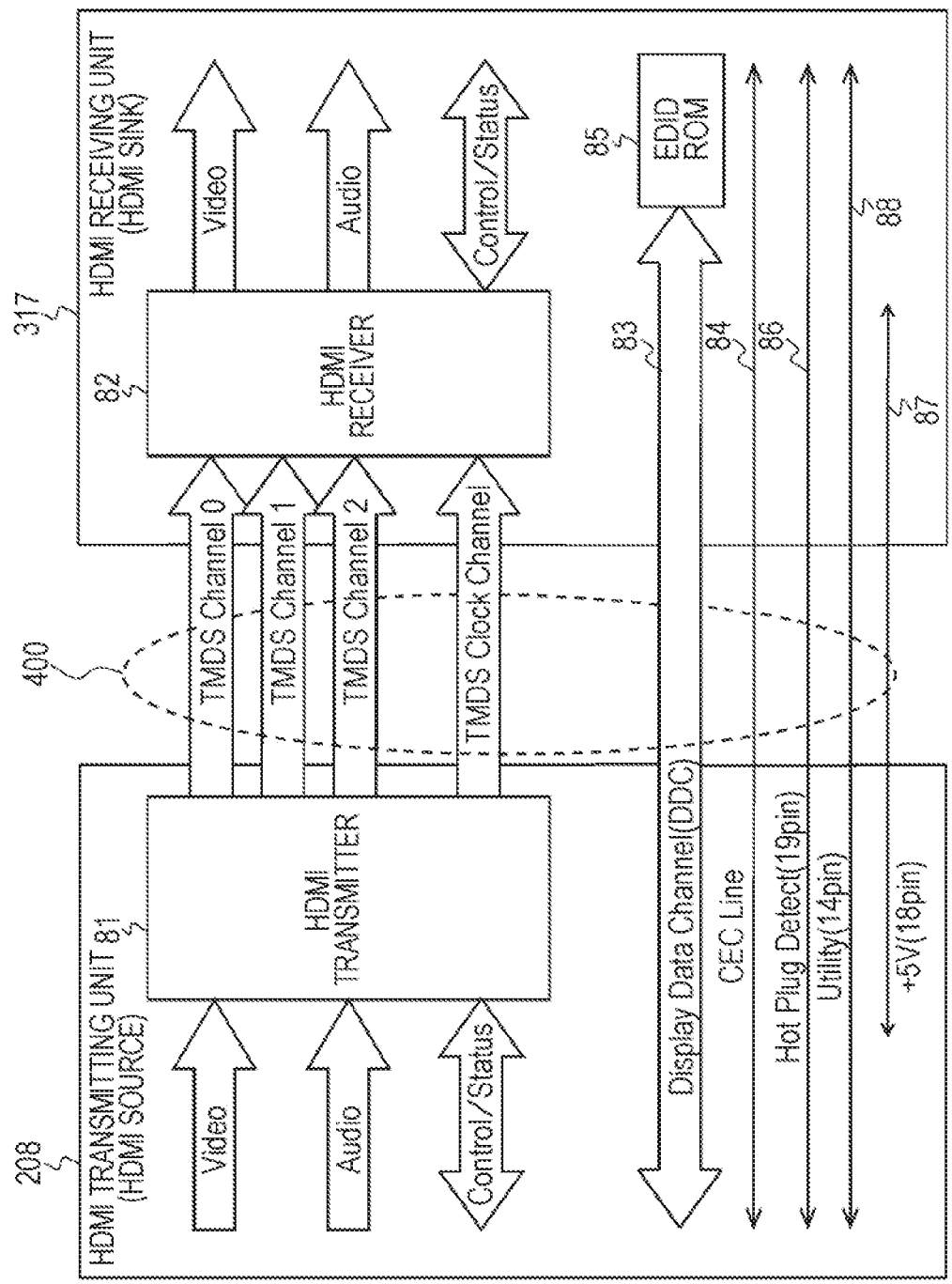
FIG. 23 is a block diagram illustrating an exemplary configuration of a HDMI transmitting unit of a set top box and a HDMI receiving unit of the television receiver.

FIG. 23 illustrates an exemplary configuration of the HDMI transmitting unit (HDMI source) 208 of the set top box 200 illustrated in FIG. 20 and the HDMI receiving unit (HDMI sink) 317 of the television receiver 300 illustrated in FIG. 22.

The HDMI transmitting unit 208 transmits a differential signal corresponding to pixel data of an image of one uncompressed screen to the HDMI receiving unit 317 in one direction through a plurality of channels during an effective image period (hereinafter, also referred to appropriately as an "active video period"). Here, the effective image period is a period obtained by subtracting a horizontal blanking period of time and a vertical blanking period of time from a period ranging from a certain vertical synchronous signal to a next vertical synchronous signal. The HDMI transmitting unit 208 transmits a differential signal corresponding to at least audio data or control data attached to an image, other auxiliary data, and the like to the HDMI receiving unit 317 in one direction through a plurality of channels in the horizontal blanking period of time or the vertical blanking period of time.

Transmission channels of a HDMI system configured with the HDMI transmitting unit 208 and the HDMI receiving unit 317 include the following transmission channels. In other words, there are three TMDS channels #0 to #2 as a transmission channel used for serially transmitting pixel data and audio data from the HDMI transmitting unit 208 to the HDMI receiving unit 317 in one direction in synchronization with a pixel clock. Further, as a transmission channel used for transmitting the pixel clock, there is a TMDS clock channel.

The HDMI transmitting unit 208 includes a HDMI transmitter 81. For example, the transmitter 81 converts pixel data of an uncompressed image into a corresponding differential signal, and serially transmits the differential signal to the HDMI receiving unit 317 connected through the HDMI cable 400 in one direction through a plurality of channels, that is, the three TMDS channels #0, #1, and #2.

The transmitter 81 converts the audio data attached to the uncompressed image, the necessary control data, other auxiliary data, and the like into the corresponding differential signal, and serially transmits the differential signal to the HDMI receiving unit 317 in one direction through the three TMDS channels #0, #1, and #2.

Further, the transmitter 81 transmits the pixel clock synchronized with the pixel data transmitted through the three TMDS channels #0, #1, and #2 to the HDMI receiving unit 317 connected through the HDMI cable 400 through the TMDS clock channel. Here, the pixel data of 10 bits is transmitted through one TMDS channel #i (i=0, 1, and 2) during one clock of the pixel clock.

The HDMI receiving unit 317 receives the differential signal corresponding to the pixel data transmitted from the HDMI transmitting unit 208 in one direction through a plurality of channels in the active video period. The HDMI receiving unit 317 receives the differential signal corresponding to the audio data or the control data transmitted from the HDMI transmitting unit 208 in one direction through a plurality of channels in the horizontal blanking period of time or the vertical blanking period of time.

In other words, the HDMI receiving unit 317 includes a HDMI receiver 82. The HDMI receiver 82 receives the differential signal corresponding to the pixel data and the differential signal corresponding to the audio data or the control data transmitted from the HDMI transmitting unit 208 in one direction through the TMDS channels #0, #1, and #2. In this case, the receiving is performed in synchronization with the pixel clock transmitted from the HDMI transmitting unit 208 through the TMDS clock channel.

The transmission channels of the HDMI system include a display data channel (DDC) 83 and a transmission channels called a CEC line 84 in addition to the TMDS channels #0 to #2 and the TMDS clock channel. The DDC 83 is configured with two signal lines (not illustrated) included in the HDMI cable 400. The DDC 83 is used when the HDMI transmitting unit 208 reads enhanced extended display identification data (E-EDID) from the HDMI receiving unit 317.

The HDMI receiving unit 317 includes an EDID read only memory (ROM) 85 that stores the E-EDID serving as performance information related to its performance (configuration/capability) in addition to the HDMI receiver 81. The HDMI transmitting unit 208 reads the E-EDID from the HDMI receiving unit 317 connected through the HDMI cable 400 through the DDC 83, for example, according to a request from the CPU 211 (see FIG. 20).

The HDMI transmitting unit 208 transfers the read E-EDID to the CPU 211. The CPU 211 stores the E-EDID in the flash ROM 212 or the DRAM 213.

The CEC line 84 is configured with a single signal line (not illustrated) included in the HDMI cable 400 and used for performing two-way communication of control data between the HDMI transmitting unit 208 and the HDMI receiving unit 317. The CEC line 84 configures a control data line.

The HDMI cable 400 includes a line (HPD line) 86 connected to a pin called a hot plug detect (HPD). A source device can detect a connection of a sink device using the line 86. The HPD line 86 is used as a HEAC-line configuring a two-way communication path as well. The HDMI cable 400 includes a power line 87 used for supplying electric power from the source device to the sink device. The HDMI cable 400 further includes a utility line 88. The utility line 88 is used as a HEAC+line configuring the two-way communication path as well.

Figure 24:
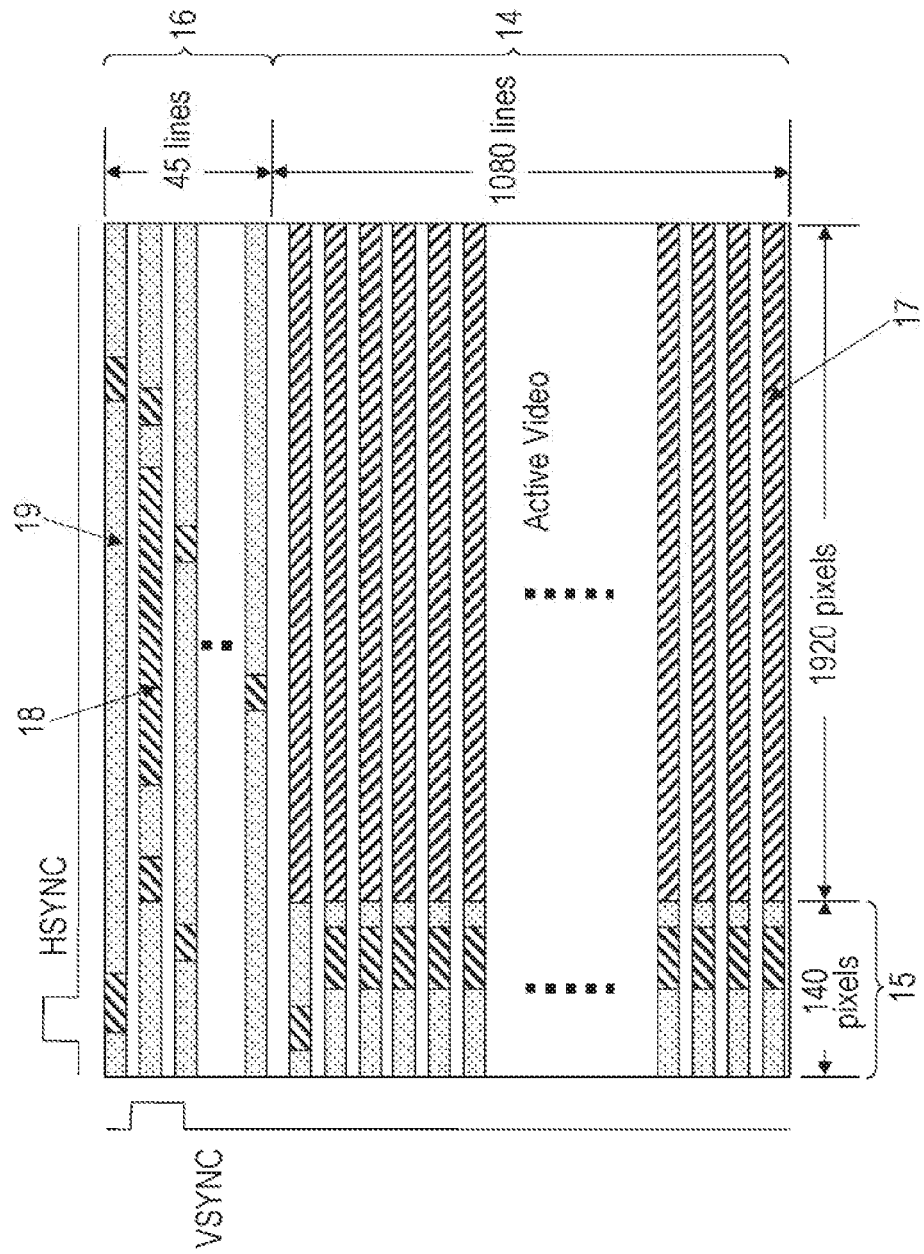
FIG. 24 illustrates various kinds of transmission data periods when image data is transmitted through a TMDS channel.

FIG. 24 illustrates various kinds of transmission data periods when image data of 1920 pixels×1080 lines are transmitted through the TMDS channels #0, #1, and #2. There are three kinds of periods, that is, a video data period 17, a data island period 18, and a control period 19 in a video field in which transmission data is transmitted through the three TMDS channels #0, #1, and #2 of the HDMI.

Here, the video field period is a period ranging from a rising edge (Active Edge) of a certain vertical synchronous signal to a rising edge of a next vertical synchronous signal and divided into a horizontal blanking period of time 15 (Horizontal Blanking), a vertical blanking period of time 16 (Vertical Blanking), and an effective pixel period 14 (Active Video) serving as a period obtained by subtracting the horizontal blanking period of time and the vertical blanking period of time from the video field period.

The video data period 17 is allocated to the effective pixel period 14. In the video data period 17, data of effective pixels (Active Pixels) of 1920 pixels×1080 lines configuring image data of one uncompressed screen is transmitted. The data island period 18 and the control period 19 are allocated to the horizontal blanking period of time 15 and the vertical blanking period of time 16. In the data island period 18 and the control period 19, the auxiliary data is transmitted.

In other words, the data island period 18 is allocated to a part of the horizontal blanking period of time 15 and a part of the vertical blanking period of time 16. In the data island period 18, among the auxiliary data, a packet of data irrelevant to control, for example, a packet of the audio data is transmitted. The control period 19 is allocated to another part of the horizontal blanking period of time 15 and another part of the vertical blanking period of time 16. In the control period 19, among the auxiliary data, a packet of data relevant to control, for example, the vertical synchronous signal, the horizontal synchronous signal, a control packet, and the like are transmitted.

Next, a specific example of the process using the metadata in the television receiver 300 will be described with reference to FIG. 25. The television receiver 300 acquires, for example, an initial server URL, network service identification information, a target file name, a session start/end command, a media recording/reproducing command, and the like as the metadata.

The television receiver 300 serving as a network client accesses a primary server using the initial server URL. Then, the television receiver 300 acquires information such as a streaming server URL, a target file name, a MIME type indicating a type of a file, and media reproduction time information from the primary server.

Then, the television receiver 300 accesses a streaming server using the streaming server URL. Then, the television receiver 300 designates the target file name. Here, when a service is received in a multicast manner, the television receiver 300 specifies a service of a program based on network identification information and service identification information.

Then, the television receiver 300 starts or ends a session with the streaming server according to the session start/end command. Further, the television receiver 300 acquires media data from the streaming server using the media recording/reproducing command during the session with the streaming server.

Figure 25:
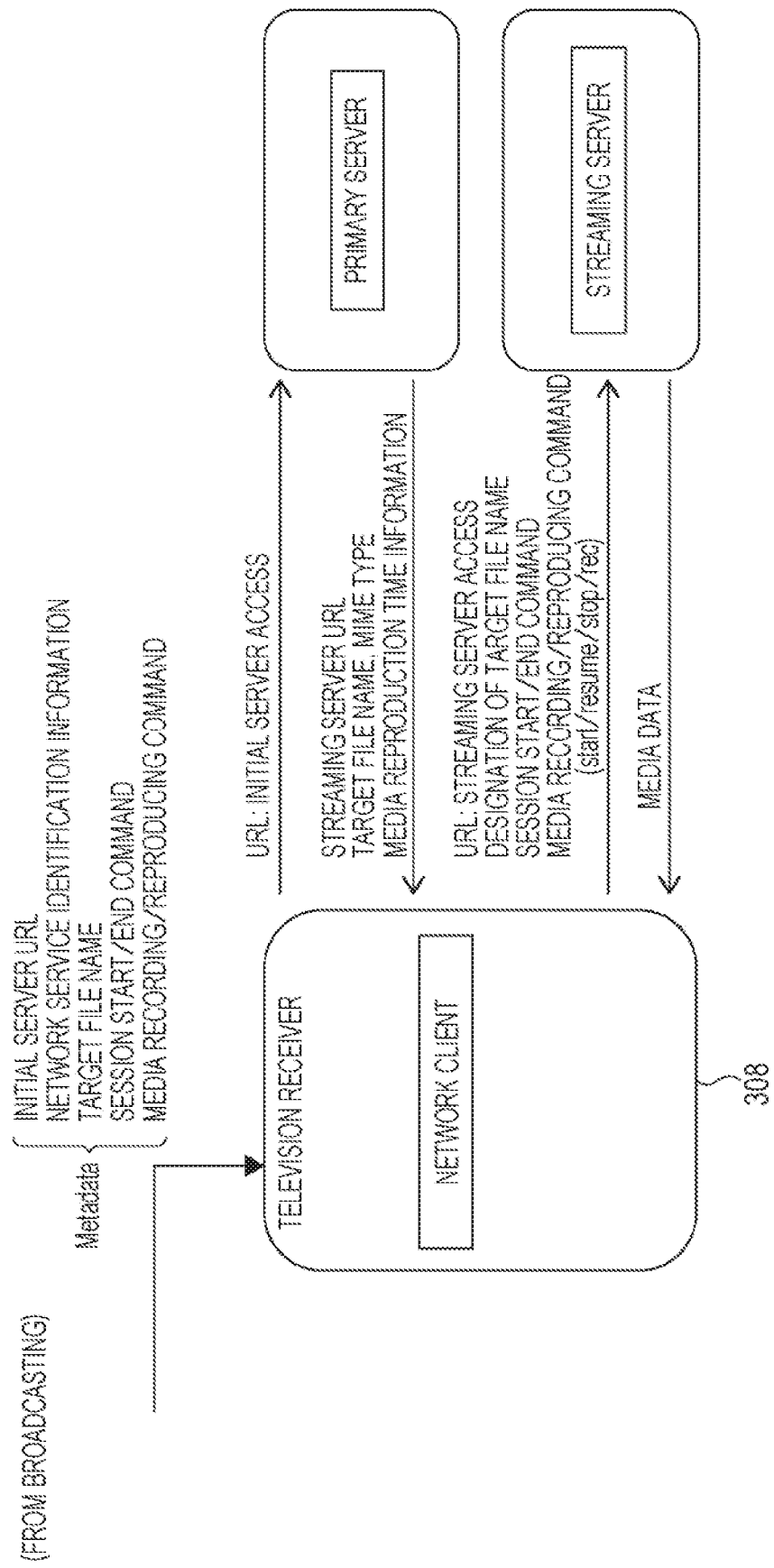
FIG. 25 is a diagram for describing a specific example of a process of using metadata in the television receiver.

In the example of FIG. 25, the primary server and the streaming server are separately arranged. However, the servers may integrally be configured.

Figure 26:
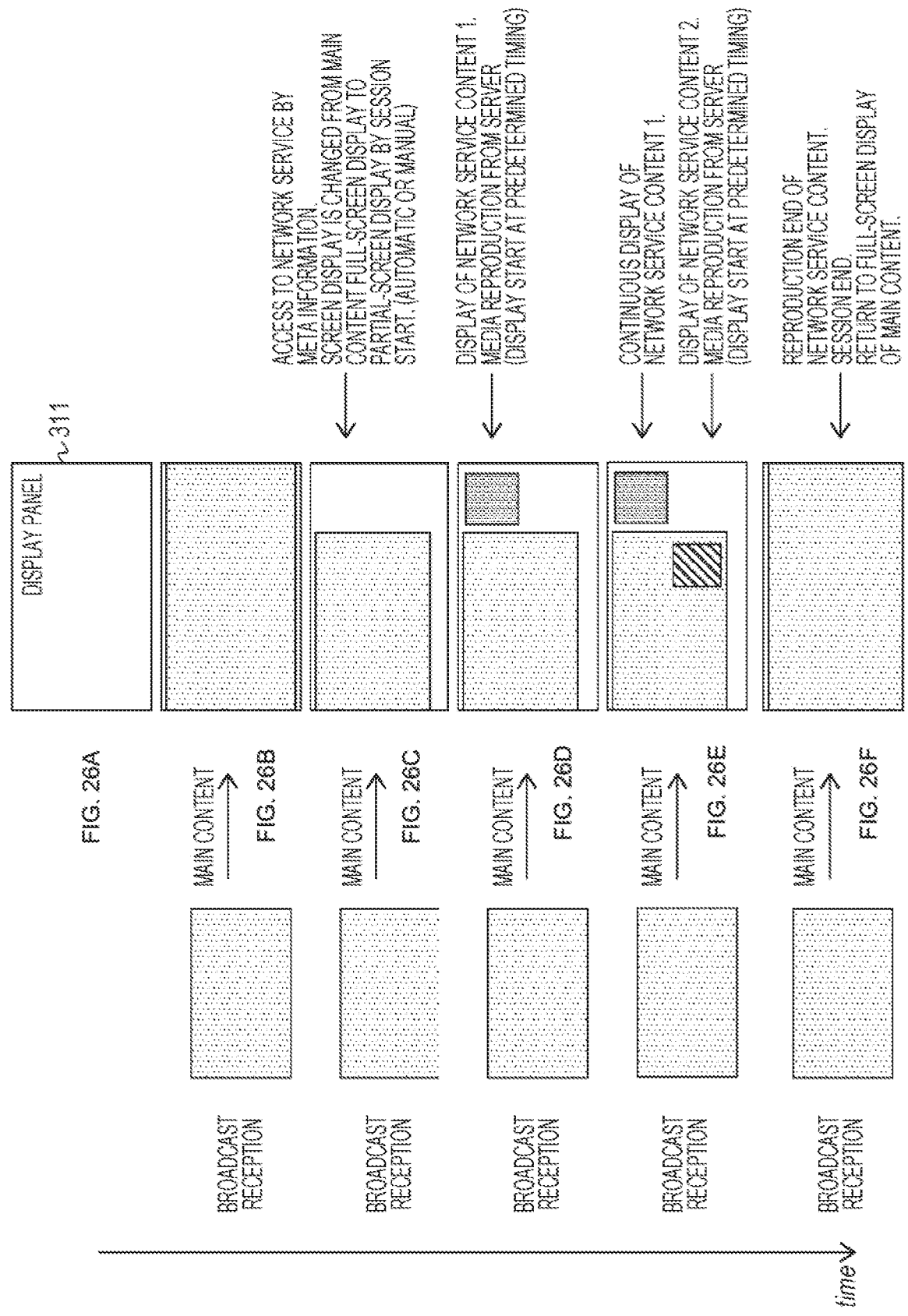
FIGS. 26A, 26B, 26C, 26D, 26E, and 26F are diagrams illustrating a transition example of a screen display when the television receiver accesses a network service based on metadata.

FIGS. 26A, 26B, 26C, 26D, 26E, and 26F illustrates a transition example of a screen display when the television receiver 300 accesses the network service based on the metadata. FIG. 26A illustrates a state in which no image is displayed on the display panel 311. FIG. 26B illustrates a state in which broadcast reception starts, and main content related to the broadcast reception is displayed on the display panel 311 in a full-screen display form.

FIG. 26C illustrates a state in which there is access to the service based on the metadata, and a session starts between the television receiver 300 and the server. In this case, the display of the main content related to the broadcast reception is changed from the full-screen display to the partial-screen display.

FIG. 26D illustrates a state in which media reproduction from the server is performed, and network service content 1 is displayed on the display panel 311 in parallel with the display of the main content. FIG. 26E illustrates a state in which media reproduction from the server is performed, and network service content 2 is displayed on the display panel 311 to be superimposed on the main content together with the network service content 1 in parallel with the display of the main content.

FIG. 26F illustrates a state in which the reproduction of the service content from the network ends, and the session between the television receiver 300 and the server ends. In this case, the display panel 311 returns to the state in which the main content related to the broadcast reception is displayed in the full-screen display form.

Figure 27:
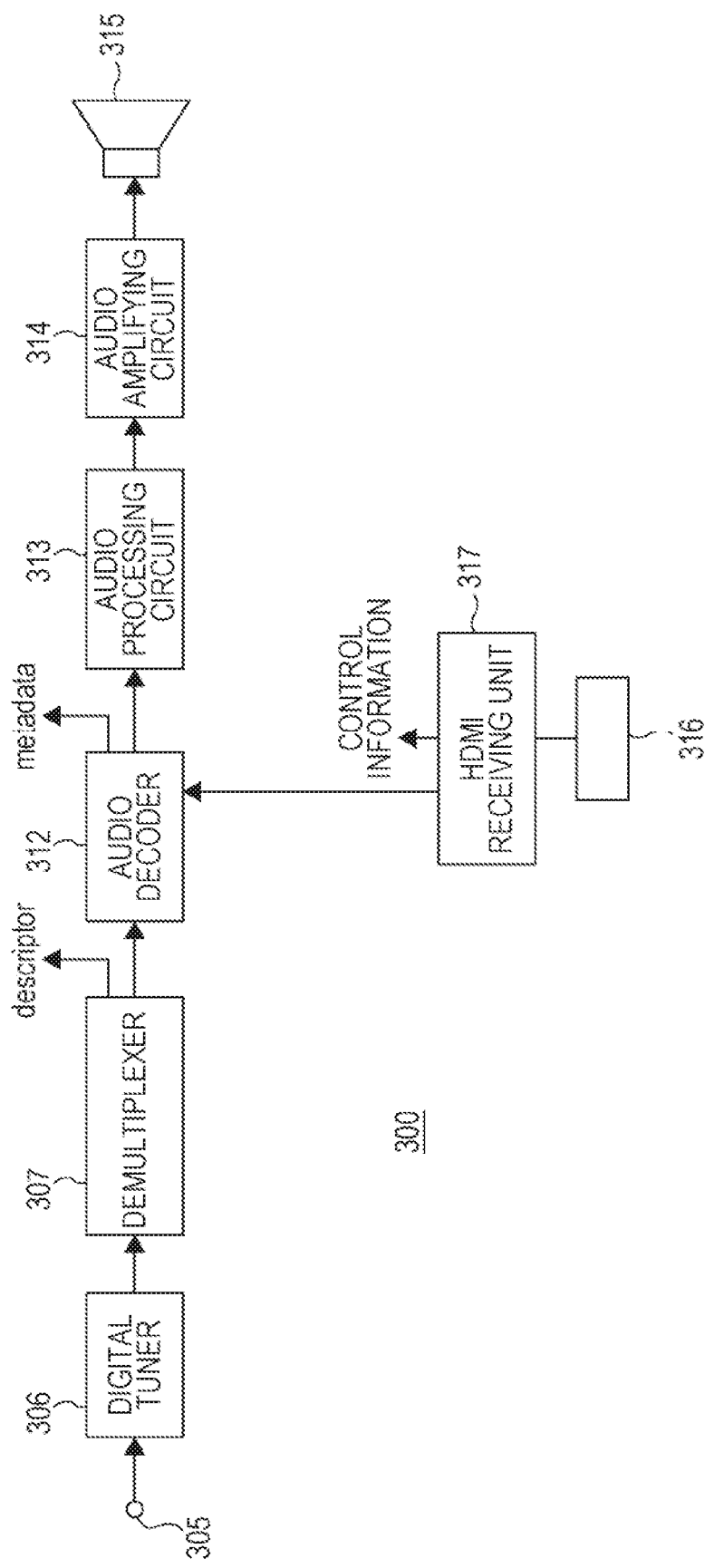
FIG. 27 is a block diagram illustrating a configuration of an audio output system in the television receiver according to an embodiment.

The television receiver 300 illustrated in FIG. 22 includes the speaker 314 and has a configuration in which the audio data obtained by the audio decoder 312 is supplied to the speaker 315 via the audio processing circuit 313 and the audio amplifying circuit 314, and thus the sound is output from the speaker 315 as illustrated in FIG. 27.

Figure 28:
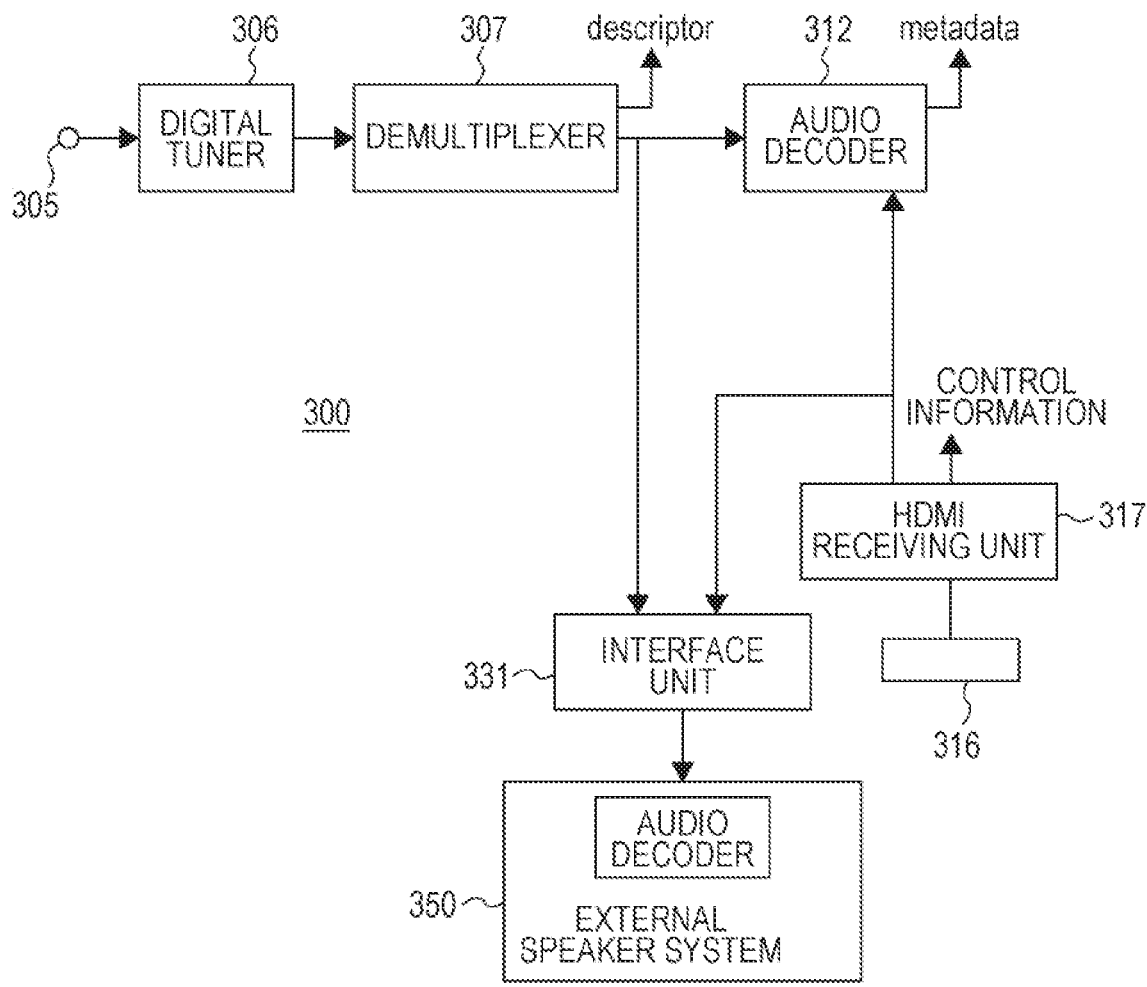
FIG. 28 is a block diagram illustrating another exemplary configuration of the audio output system in the television receiver.

However, as illustrated in FIG. 28, the television receiver 300 may have a configuration in which no speaker is arranged, and the audio stream obtained by the demultiplexer 307 or the HDMI receiving unit 317 is supplied from an interface unit 331 to an external speaker system 350. The interface unit 331 is a digital interface such as a high-definition multimedia interface (HDMI), a Sony Philips digital interface (SPDIF), or a mobile high-definition link (MHL).

In this case, an audio decoder 351a arranged in the external speaker system 350 performs the decoding process on the audio stream, and thus the sound is output from the external speaker system 350. Further, even when the television receiver 300 is equipped with the speaker 315 (see FIG. 27), the audio stream may be supplied from the interface unit 331 to the external speaker system 350 (see FIG. 28).

As described above, in the image display system 10 illustrated in FIG. 1, the broadcast transmission device 100 inserts the metadata into the audio stream, and inserts the identification information indicating that the metadata is inserted into the audio stream into the layer of the container. Thus, the reception side (the set top box 200 and the television receiver 300) can easily recognize that the metadata is inserted into the audio stream.

Further, in the image display system 10 illustrated in FIG. 1, the set top box 200 transmits the audio stream into which the metadata is inserted to the television receiver 300 together with the identification information indicating that the metadata is inserted into the audio stream according to the HDMI. Thus, the television receiver 300 can easily recognize that the metadata is inserted into the audio stream and acquire and use the metadata reliably without waste by performing the process of extracting the metadata inserted into the audio stream based on the recognition.

Further, in the image display system 10 illustrated in FIG. 1, the television receiver 300 extracts the metadata from the audio stream based on the identification information received together with the audio stream and uses the extracted metadata for a process. Thus, it is possible to acquire the metadata inserted into the audio stream reliably without waste and execute the process using the metadata appropriately.

2. MODIFIED EXAMPLES

In the above embodiment, the set top box 200 is configured to receive the image data and the audio stream from the broadcast signal transmitted from the broadcast transmission device 100. However, the set top box 200 may be configured to receive the image data and the audio stream from the delivery server (the streaming server) via the network.

Further, in the above embodiment, the set top box 200 is configured to transmit the image data and the audio stream to the television receiver 300. However, the image data and the audio stream may be transmitted to a monitor device, a projector, or the like instead of the television receiver 300. Instead of the set top box 200, a recorder with a reception function, a personal computer, or the like may be used.

Figure 29:
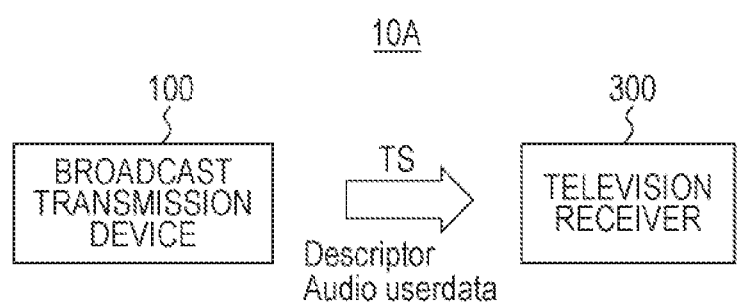
FIG. 29 is a block diagram illustrating another exemplary configuration of the image display system.

Further, in the above embodiment, the set top box 200 and the television receiver 300 are connected through the HDMI cable 400. However, even whether the set top box 200 and the television receiver 300 are connected through a digital interface similar to the HDMI in a wired manner or a wireless manner, the invention can similarly be applied. Further, in the above embodiment, the image display system 10 is configured with the broadcast transmission device 100, the set top box 200, and the television receiver 300. However, an image display system 10A may be configured with the broadcast transmission device 100 and the television receiver 300 as illustrated in FIG. 29.

Further, in the above embodiment, the container is the transport stream (MPEG-2 TS). However, the present technology can similarly be applied even to the system in which delivery is performed through a container of MP4 or any other format. For example, there are an MPEG-DASH-based stream delivery system, a transceiving system that deals with an MPEG media transport (MMT) structure transmission stream, and the like.

(1)
A transmission device, including:
a transmitting unit that transmits a container of a predetermined format including an audio stream into which metadata is inserted; and
an information inserting unit that inserts identification information indicating that the metadata is inserted into the audio stream into a layer of the container.

(2)
The transmission device according to (1),
wherein the metadata includes network access information.

(3)
The transmission device according to (2),
wherein the network access information is network access information used for acquiring media information related to image data included in a video stream included in the container from a server on a network.

(4)
The transmission device according to (1),
wherein the metadata includes reproduction control information of media information.

(5)
The transmission device according to (4),
wherein the media information is media information related to image data included in a video stream included in the container.

(6)
The transmission device according to any of (1) to (5),
wherein information of an encoding scheme of audio data in the audio stream is added to the identification information.

(7)
The transmission device according to any of (1) to (6), wherein type information indicating a type of the metadata is added to the identification information.

(8)
The transmission device according to any of (1) to (7), wherein flag information indicating whether or not the metadata is inserted into only the audio stream is added to the identification information.

(9)
The transmission device according to any of (1) to (8), wherein type information indicating a type of an insertion frequency of the metadata into the audio stream is added to the identification information.

(10)
A transmission method, including:
a transmission step of transmitting, by a transmitting unit, a container of a predetermined format including an audio stream into which metadata is inserted; and
an information insertion step of inserting identification information indicating that the metadata is inserted into the audio stream into a layer of the container.

(11)
A reception device, including:
a receiving unit that receives a container of a predetermined format including an audio stream into which metadata is inserted, wherein identification information indicating that the metadata is inserted into the audio stream is inserted into a layer of the container; and
a transmitting unit that transmits the audio stream to an external device via a predetermined transmission path together with the identification information indicating that the metadata is inserted into the audio stream.

(12)
The reception device according to (11), wherein the transmitting unit transmits the audio stream and the identification information to the external device by inserting the audio stream and the identification information into a blanking period of time of image data obtained by decoding a video stream included in the container and transmitting the image data to the external device.

(13)
The reception device according to (11) or (12), wherein the predetermined transmission path is a high definition multimedia interface (HDMI) cable.

(14)
A reception method, including:
a reception step of receiving, by a receiving unit, a container of a predetermined format including an audio stream into which metadata is inserted, wherein identification information indicating that the metadata is inserted into the audio stream is inserted into a layer of the container; and
a transmission step of transmitting the audio stream to an external device via a predetermined transmission path together with the identification information indicating that the metadata is inserted into the audio stream.

(15)
A reception device, including:
a receiving unit that receives an audio stream from an external device via a predetermined transmission path together with identification information indicating that metadata is inserted into the audio stream;
a metadata extracting unit that decodes the audio stream based on the identification information and extracts the metadata; and
a processing unit that performs a process using the metadata.

(16)
The reception device according to (15), further including, an interface unit that transmits the audio stream to an external speaker system.

(17)
The reception device according to (15) or (16), wherein the predetermined transmission path is a high definition multimedia interface (HDMI) cable.

(18)
The reception device according to any of (15) to (17), wherein the metadata includes network access information, and
the processing unit accesses a predetermined server on a network based on the network access information, and acquires predetermined media information.

(19)
A reception method, including:
a reception step of receiving, by a receiving unit, an audio stream from an external device via a predetermined transmission path together with identification information indicating that metadata is inserted into the audio stream;
a metadata extraction step of decoding the audio stream based on the identification information and extracting the metadata; and
a processing step of performing a process using the metadata.

(20)
A reception device, including:
a receiving unit that receives a container of a predetermined format including an audio stream into which metadata is inserted, wherein identification information indicating that the metadata is inserted into the audio stream is inserted into a layer of the container; and
a metadata extracting unit that decodes the audio stream based on the identification information and extracts the metadata; and
a processing unit that performs a process using the metadata.

One of the main features of the present technology lies in that the metadata is inserted into the audio stream, and the identification information indicating that the metadata is inserted into the audio stream is inserted into the layer of the container, and thus at the reception side, it is possible to easily recognize that the metadata is inserted into the audio stream (see FIG. 19).

REFERENCE SIGNS LIST 10, 10A Image display system
14 Effective pixel period
15 Horizontal blanking period of time
16 Vertical blanking period of time
17 Video data period
18 Data island period
19 Control period
81 HDMI transmitter
82 HDMI receiver
83 DDC
84 CEC line
85 EDID ROM
100 Broadcast transmission device
110 Stream generating unit
111 Control unit
111a CPU
112 Video encoder
113 Audio encoder
113a Audio encoding block unit 113b Audio framing unit
114 Multiplexer
200 Set top box (STB)
203 Antenna terminal
204 Digital tuner
205 Demultiplexer
206 Video decoder
207 Audio framing unit
208 HDMI transmitting unit
209 HDMI terminal
211 CPU
212 Flash ROM
213 DRAM
214 Internal bus
215 Remote controller receiving unit
216 Remote controller transmitter
300 Television receiver
305 Antenna terminal
306 Digital tuner
307 Demultiplexer
308 Video decoder
309 Video processing circuit
310 Panel driving circuit
311 Display panel
312 Audio decoder
313 Audio processing circuit
314 Audio amplifying circuit
315 Speaker
316 HDMI terminal
317 HDMI receiving unit
318 Communication interface
321 CPU
322 Flash ROM
323 DRAM
324 Internal bus
325 Remote controller receiving unit
326 Remote controller transmitter
350 External speaker system
400 HDMI cable

What is claimed is:

1. A reception device, comprising:
circuitry configured to:
receive, via a broadcast, a container of a determined format, wherein
the container includes an audio stream into which metadata is inserted, and
the metadata includes network access information to access a first server;
acquire information from the first server based on the network access information, wherein the information includes a URL of a second server, a name of a target file, a type of the target file, and time information;
acquire the target file from the second server based on the URL of the second server and the name of the target file; and
control display of content based on the acquired target file and the time information.

2. The reception device according to claim 1, wherein the container further includes identification information that indicates insertion of the metadata into the audio stream.

3. The reception device according to claim 2, wherein the identification information further indicates a frequency of the metadata.

4. The reception device according to claim 1, wherein the circuitry is further configured to control display of main content,
the content and the main content are concurrently displayable on a screen, and
the container further includes the main content.

5. The reception device according to claim 4, wherein the circuitry is further configured to control the display of the content to superimpose the content on the main content.

6. The reception device according to claim 4, wherein the circuitry is further configured to control the display of the main content in a partial-screen display form.

7. The reception device according to claim 6, wherein the circuitry is further configured to control, based on reproduction of the content, the display of the main content in full-screen form.

8. The reception device according to claim 1, wherein the first server and the second server are configured integrally.

9. A reception method, comprising:
receiving, by circuitry via a broadcast, a container of a determined format, wherein
the container includes an audio stream into which metadata is inserted, and
the metadata includes network access information for accessing a first server;
acquiring, by the circuitry, information from the first server based on the network access information, wherein the information includes a URL of a second server, a name of a target file, a type of the target file, and time information;
acquiring, by the circuitry, the target file from the second server based on the URL of the second server and the name of the target file; and
controlling, by the circuitry, display of content based on the acquired target file and the time information.

10. The reception method according to claim 9, wherein the container further includes identification information that indicates insertion of the metadata into the audio stream.

11. The reception method according to claim 10, wherein the identification information further indicates a frequency of the metadata.

12. The reception method according to claim 9, further comprising:
controlling display of main content, wherein
the content and the main content are concurrently displayable on a screen, and
the container further includes the main content.

13. The reception method according to claim 12, further comprising controlling the display of the content to superimpose the content on the main content.

14. The reception method according to claim 12, further comprising controlling the display of the main content in a partial-screen display form.

15. The reception method according to claim 14, further comprising controlling, based on reproduction of the content, the display of the main content in a full-screen display form.

16. The reception method according to claim 9, wherein the first server and the second server are configured integrally.

17. A non-transitory computer-readable medium having stored thereon computer-executable instructions that, when executed by a processor, cause the processor to execute operations, the operations comprising:
receiving, via a broadcast, a container of a determined format, wherein
the container includes an audio stream into which metadata is inserted, and
the metadata includes network access information for accessing a first server;

acquiring information from the first server based on the network access information, wherein the information includes a URL of a second server, a name of a target file, a type of the target file, and time information;

acquiring the target file from the second server based on the URL of the second server and the name of the target file; and controlling display of content based on the acquired target file and the time information.

* * * * *